United States Patent
Zhang et al.

(10) Patent No.: US 12,535,547 B2
(45) Date of Patent: Jan. 27, 2026

(54) SYSTEM AND METHOD FOR CONSISTENCY-AWARE LEARNABLE MULTI-PRIOR RECONSTRUCTION FOR MAGNETIC RESONANCE IMAGING

(71) Applicant: The Chinese University of Hong Kong, Hong Kong (CN)

(72) Inventors: Liping Zhang, Hong Kong (CN); Weitian Chen, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 143 days.

(21) Appl. No.: 18/604,294

(22) Filed: Mar. 13, 2024

(65) Prior Publication Data

US 2024/0361411 A1  Oct. 31, 2024

Related U.S. Application Data

(60) Provisional application No. 63/461,847, filed on Apr. 25, 2023.

(51) Int. Cl.
*G01R 33/56* (2006.01)
*G01R 33/565* (2006.01)
(Continued)

(52) U.S. Cl.
CPC ....... *G01R 33/5608* (2013.01); *G01R 33/565* (2013.01); *G01R 33/58* (2013.01);
(Continued)

(58) Field of Classification Search
CPC .. G01R 33/5608; G01R 33/565; G01R 33/58; G06T 11/005; G06T 11/006; G06T 2211/441; G06T 2211/424
See application file for complete search history.

(56) References Cited

U.S. PATENT DOCUMENTS

| | | | |
|---|---|---|---|
| 11,300,645 B2 * | 4/2022 | Schlemper | G01R 33/5608 |
| 11,885,862 B2 * | 1/2024 | Chatterjee | A61B 5/055 |
| 2023/0326099 A1 * | 10/2023 | Lee | A61B 5/00 382/131 |

OTHER PUBLICATIONS

Han, et al,. "k-space deep learning for accelerated mri," IEEE transactions on medical imaging, vol. 39, pp. 377-386. (2020).

(Continued)

*Primary Examiner* — Gregory H Curran
(74) *Attorney, Agent, or Firm* — Kilpatrick Townsend & Stockton LLP

(57) ABSTRACT

Techniques for performing iterative MRI image reconstruction by learning complementary multi-prior knowledge from images, k-space data, and calibration data are disclosed. In one method, k-space data is obtained from an MRI scan. Image-space modifications are performed on the k-space data using a first neural network trained to operate on data in image space. The k-space data is converted from the frequency domain to a spatial domain to produce input image-space data. Using the first neural network, output image-space data is generated, which is then converted from the spatial domain to the frequency domain. K-space modifications are performed on the k-space data using a second neural network trained to operate on data in k-space. ACS are encoded using a third neural network to guide the second neural network in learning consistency-aware k-space correlations. The k-space data is converted from the frequency domain to the spatial domain to obtain a reconstructed image.

20 Claims, 16 Drawing Sheets

(51) Int. Cl.
    G01R 33/58      (2006.01)
    G06T 11/00      (2006.01)
(52) U.S. Cl.
    CPC .......... *G06T 11/005* (2013.01); *G06T 11/006* (2013.01); *G06T 2211/424* (2013.01); *G06T 2211/441* (2023.08)

(56) References Cited

OTHER PUBLICATIONS

Zhang, et al., "Multi-channel generative adversarial network for parallel magnetic resonance image reconstruction in kspace," Medical Image Computing and Computer Assisted Intervention—MICCAI 2018: 21st International Conference, Granada, Spain, Sep. 16-20, 2018, Proceedings, Part I, Springer, pp. 180-188. (2018).

Eo, et al. "Kiki-net: cross-domain convolutional neural networks for reconstructing undersampled magnetic resonance images," Magnetic resonance in medicine. Vol. 80, pp. 2188-2201. (2018).

Wang, et al., "Dimension: dynamic mr imaging with both k-space and spatial prior knowledge obtained via multi-supervised network training," NMR in Biomedicine, vol. 35, e4131. (2022).

Ran, et al., "Md-recon-net: a parallel dual-domain convolutional neural network for compressed sensing mri," IEEE Transactions on Radiation and Plasma Medical Sciences, vol. 5, pp. 120-135. (2020).

Wang, et al., "Ikwi-net: A cross-domain convolutional neural network for undersampled magnetic resonance image reconstruction," Magnetic resonance imaging, vol. 73, pp. 1-10. (2020b).

Sriram, et al., "Grappanet: Combining parallel imaging with deep learning for multi-coil mri reconstruction," Proceedings of the IEEE/CVF Conference on Computer Vision and Pattern Recognition, pp. 14315-14322. (2020b).

Ryu, et al., "Improving high frequency image features of deep learning reconstructions via k-space refinement with nullspace kernel. Magnetic Resonance in Medicine," vol. 88, pp. 1263-1272. (2022).

* cited by examiner

SYSTEM AND METHOD FOR CONSISTENCY-AWARE LEARNABLE MULTI-PRIOR RECONSTRUCTION FOR MAGNETIC RESONANCE IMAGING

BACKGROUND OF THE INVENTION

Magnetic Resonance Imaging (MRI) is a widely used medical imaging technique that produces detailed images of the inside of the human body. MRI works by generating a strong magnetic field around the body, which causes the protons in the body's water molecules to align with the magnetic field. The MRI machine then emits radiofrequency pulses that cause these protons to flip, emitting signals that are detected by the machine and used to generate images of the body. However, the raw signals obtained from an MRI scan are not directly interpretable, and must be reconstructed into an image through an MRI reconstruction process.

MRI reconstruction is an important step in the MRI imaging process, as it plays a key role in determining the quality of the final image. Reconstruction algorithms can use mathematical techniques to transform the raw MRI signals into a digital image that can be viewed and analyzed by medical professionals. The process of MRI reconstruction can be computationally intensive, and can involve a range of techniques such as filtering, Fourier transform, and interpolation. Improving the accuracy and speed of MRI reconstruction is an ongoing area of research in the field of medical imaging, with the goal of producing higher quality images and reducing the time and cost associated with MRI scans.

BRIEF SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method of performing magnetic resonance imaging (MRI) image reconstruction, the computer-implemented method comprising: obtaining k-space data from an MRI scan, wherein the k-space data is under-sampled in a frequency domain; for each of a set of iterations: performing image-space modifications on the k-space data using a first neural network trained to operate on data in image space by: converting the k-space data from the frequency domain to a spatial domain to produce input image-space data; generating, using the first neural network, output image-space data by inputting the input image-space data into the first neural network; and converting the output image-space data from the spatial domain to the frequency domain to obtain the k-space data incorporating the image-space modifications; and performing k-space modifications on the k-space data using a second neural network trained to operate on data in k-space by inputting the k-space data into the second neural network to obtain the k-space data incorporating the k-space modifications; and converting the k-space data from the frequency domain to the spatial domain to obtain a reconstructed image.

Example 2 is the computer-implemented method of example(s) 1, further comprising: zero-filling the k-space data.

Example 3 is the computer-implemented method of example(s) 1, further comprising: estimating a set of coil sensitivity maps based on the k-space data, wherein the image-space modifications are performed on the k-space data further using the set of coil sensitivity maps.

Example 4 is the computer-implemented method of example(s) 3, wherein the reconstructed image is obtained by using the set of coil sensitivity maps to compensate for an uneven signal reception strength for individual receiver coils used in a multi-coil setup.

Example 5 is the computer-implemented method of example(s) 1, further comprising: for each of the set of iterations: performing a frequency fusion operation on the k-space data by summing the k-space data incorporating the image-space modifications and the k-space data incorporating the k-space modifications.

Example 6 is the computer-implemented method of example(s) 5, wherein performing the frequency fusion operation includes using an under-sampling pattern to sum the k-space data incorporating the image-space modifications and the k-space data incorporating the k-space modifications.

Example 7 is the computer-implemented method of example(s) 1, wherein one or both of the first neural network and the second neural network were previously trained by: obtaining training k-space data; performing the image-space modifications and the k-space modifications on the training k-space data and thereafter converting the training k-space data from the frequency domain to the spatial domain to obtain a training reconstructed image; comparing the training reconstructed image to a reference image to compute a reconstruction loss; and modifying weights associated with one or both of the first neural network and the second neural network based on the reconstruction loss.

Example 8 is the computer-implemented method of example(s) 1, wherein the k-space data incorporating the k-space modifications is obtained further using a surface data fidelity layer configured to reduce effects of data imperfections due to padding in the k-space domain.

Example 9 is the computer-implemented method of example(s) 1, wherein the k-space data incorporating the k-space modifications is obtained further using a calibration consistency module configured to encode calibration features from auto-calibration signals (ACS) and to guide the second neural network in learning consistency-aware k-space correlations.

Example 10 is the computer-implemented method of example(s) 1, further comprising: for each of the set of iterations: utilizing a calibration consistency module to encode calibration features through the implementation of a self-consistency mechanism by inputting auto-calibration signals (ACS) and generating training reconstructed ACS; comparing the training reconstructed ACS data to the inputted ACS data in order to calculate a calibration consistency loss; modifying weights that are associated with the calibration consistency module (e.g., a third neural network) based on the calibration consistency loss.

Example 11 is the computer-implemented method of example(s) 1-10, further comprising: obtaining the k-space data, which incorporates the k-space modifications, by performing a calibration-aware mechanism with the calibration consistency module by sharing the network weights during training.

Example 12 is the computer-implemented method of example(s) 1-11, further comprising: obtaining the calibration consistency module, which encodes calibration features, by utilizing a surface data fidelity layer configured to mitigate the effects of data imperfections resulting from padding in the k-space domain.

Example 13 is the computer-implemented method of example(s) 1-12, further comprising: training the first neural network, the second neural network, and the third neural network by adjusting the weights based on both the reconstruction loss and the calibration consistency loss.

Example 14 is a non-transitory computer-readable medium comprising instructions that, when executed by one or more processors, cause the one or more processors to perform operations comprising: obtaining k-space data from a magnetic resonance imaging (MRI) scan, wherein the k-space data is under-sampled in a frequency domain; for each of a set of iterations: performing image-space modifications on the k-space data using a first neural network trained to operate on data in image space by: converting the k-space data from the frequency domain to a spatial domain to produce input image-space data; generating, using the first neural network, output image-space data by inputting the input image-space data into the first neural network; and converting the output image-space data from the spatial domain to the frequency domain to obtain the k-space data incorporating the image-space modifications; and performing k-space modifications on the k-space data using a second neural network trained to operate on data in k-space by inputting the k-space data into the second neural network to obtain the k-space data incorporating the k-space modifications; and converting the k-space data from the frequency domain to the spatial domain to obtain a reconstructed image.

Example 15 is the non-transitory computer-readable medium of example(s) 14, wherein the operations further comprise: zero-filling the k-space data.

Example 16 is the non-transitory computer-readable medium of example(s) 14, wherein the operations further comprise: estimating a set of coil sensitivity maps based on the k-space data, wherein the image-space modifications are performed on the k-space data further using the set of coil sensitivity maps.

Example 17 is the non-transitory computer-readable medium of example(s) 16, wherein the reconstructed image is obtained by using the set of coil sensitivity maps to compensate for an uneven signal reception strength for individual receiver coils used in a multi-coil setup.

Example 18 is the non-transitory computer-readable medium of example(s) 14, wherein the operations further comprise: for each of the set of iterations: performing a frequency fusion operation on the k-space data by summing the k-space data incorporating the image-space modifications and the k-space data incorporating the k-space modifications.

Example 19 is the non-transitory computer-readable medium of example(s) 14, wherein the k-space data incorporating the k-space modifications is obtained further using a calibration consistency module configured to encode calibration features from auto-calibration signals (ACS) and to guide the second neural network in learning consistency-aware k-space correlations, the calibration consistency module comprising a third neural network, or wherein performing the frequency fusion operation includes using an under-sampling pattern to sum the k-space data incorporating the image-space modifications and the k-space data incorporating the k-space modifications.

Example 20 is the non-transitory computer-readable medium of example(s) 14, wherein the operations further comprise: training one or both of the first neural network and the second neural network by: obtaining training k-space data; performing the image-space modifications and the k-space modifications on the training k-space data and thereafter converting the training k-space data from the frequency domain to the spatial domain to obtain a training reconstructed image; comparing the training reconstructed image to a reference image to compute a reconstruction loss; and modifying weights associated with one or both of the first neural network and the second neural network based on the reconstruction loss.

Example 21 is a system comprising: one or more processors; and a computer-readable medium comprising instructions that, when executed by the one or more processors, cause the one or more processors to perform operations comprising: obtaining k-space data from a magnetic resonance imaging (MRI) scan, wherein the k-space data is under-sampled in a frequency domain; for each of a set of iterations: performing image-space modifications on the k-space data using a first neural network trained to operate on data in image space by: converting the k-space data from the frequency domain to a spatial domain to produce input image-space data; generating, using the first neural network, output image-space data by inputting the input image-space data into the first neural network; and converting the output image-space data from the spatial domain to the frequency domain to obtain the k-space data incorporating the image-space modifications; and performing k-space modifications on the k-space data using a second neural network trained to operate on data in k-space by inputting the k-space data into the second neural network to obtain the k-space data incorporating the k-space modifications; and converting the k-space data from the frequency domain to the spatial domain to obtain a reconstructed image.

Example 22 is the system of example(s) 21, wherein the operations further comprise: zero-filling the k-space data.

Example 23 is the system of example(s) 21, wherein the operations further comprise: estimating a set of coil sensitivity maps based on the k-space data, wherein the image-space modifications are performed on the k-space data further using the set of coil sensitivity maps.

Example 24 is the system of example(s) 21, wherein the k-space data incorporating the k-space modifications is obtained further using a calibration consistency module configured to encode calibration features from auto-calibration signals (ACS) and to guide the second neural network in learning consistency-aware k-space correlations, the calibration consistency module comprising a third neural network, or wherein the reconstructed image is obtained by using the set of coil sensitivity maps to compensate for an uneven signal reception strength for individual receiver coils used in a multi-coil setup.

Example 25 is the system of example(s) 21, wherein the operations further comprise: for each of the set of iterations: performing a frequency fusion operation on the k-space data by summing the k-space data incorporating the image-space modifications and the k-space data incorporating the k-space modifications.

Example 26 is the system of example(s) 21, wherein the operations further comprise: training one or both of the first neural network and the second neural network by: obtaining training k-space data; performing the image-space modifications and the k-space modifications on the training k-space data and thereafter converting the training k-space data from the frequency domain to the spatial domain to obtain a training reconstructed image; comparing the training reconstructed image to a reference image to compute a reconstruction loss; and modifying weights associated with one or both of the first neural network and the second neural network based on the reconstruction loss.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
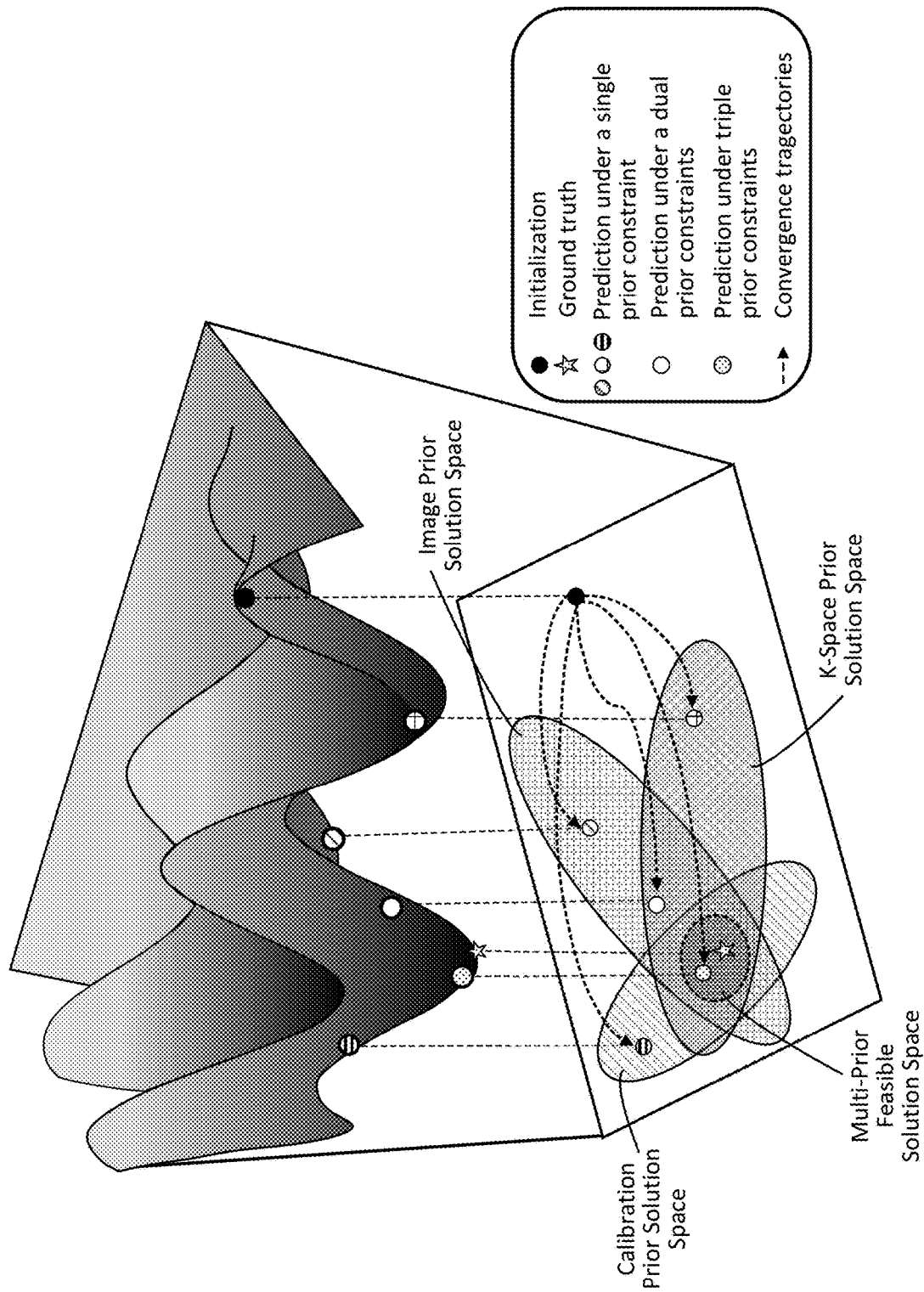
FIG. 1 shows convergence trajectories of single-prior and multi-prior reconstructions for single and multi-prior constraints.

Magnetic resonance imaging (MRI) is a non-invasive, radiation-free medical imaging technique commonly used in clinical settings. It provides high-quality images with adaptable contrasts, allowing for the examination of structural, anatomical, and functional aspects of soft tissues. However, MRI data acquisition tends to be a slow process. Lengthy acquisition times can lead to various challenges, including motion-related artifacts, restricted spatial resolution and volume coverage, and discomfort for patients, particularly among children, the elderly, and individuals with psychological disorders or neurodegenerative diseases. These limitations can make MRI less practical for numerous clinical applications.

A common method to speed up the MRI acquisition process involves skipping specific phase-encoding lines and collecting only a small portion of k-space measurements. However, images reconstructed using inverse Fourier Transform on such under-sampled k-space data exhibit aliasing artifacts and poor signal-to-noise ratio (SNR), potentially hindering clinical diagnosis by obscuring imaging biomarkers. Reconstructing artifact-free, high-quality images from under-sampled data remains a challenging and popular topic in the field. Techniques such as parallel imaging and compressed sensing have served as the basis for accelerated data acquisition in MRI for years, resulting in significant enhancements in acquisition speed and image quality. Parallel imaging employs well-designed phased array coils to facilitate spatial gradient encoding and simultaneously measure magnetic resonance (MR) signals from the underlying anatomy. Multiple coil measurements can be combined using either image domain methods to unravel aliasing patterns or spatial-frequency domain (k-space) approaches to interpolate missing signals.

Parallel imaging is employed in modern MRI scanners, but conservative speedup rates are maintained due to hardware constraints and the noise amplification experienced at higher acceleration rates. As an alternative, compressed sensing-based MRI (CS-MRI) methods capitalize on image sparsity properties, enabling rapid imaging at high acceleration rates while maintaining diagnostic image quality. However, reconstructing high-quality images from aggressively under-sampled measurements necessitates the MR signals to exhibit sparsity representation in a specific transform domain, and the aliasing interference to be incoherent in that manually selected domain. Furthermore, finding the optimal solution can be time-consuming and requires the empirical fine-tuning of regularization parameters.

In parallel MRI, the encoded spatial information of the subject is measured simultaneously by an array of radio-frequency receive coils distributed around the anatomy to be imaged. The desired image $x \in \mathbb{R}^N$ is modulated with $N_c$ coils, each with a complex-valued position-dependent sensitivity profile $S_i \in \mathbb{C}^N$ ($1 \leq i \geq N_c$), and sampled in the frequency-domain (k-space). The received noise-free signals of all coils $y \in \mathbb{C}^{N_c N}$ can be expressed as:

$$\tilde{y} = MFSx = Ax, \tag{1}$$

where $A: \mathbb{R}^N \to \mathbb{C}^{N_c N}$ is the forward process that represents the sequential operators of the coil sensitivity map projection $S: \mathbb{R}^N \to \mathbb{C}^{N_c N}$, Fourier transform $F: \mathbb{C}^{N_c N} \to \mathbb{C}^{N_c N}$, and under-sampling pattern $M: \mathbb{C}^{N_c N} \to \mathbb{C}^{N_c N}$. The coil sensitivity maps are often acquired from pre-scan or estimated from fully-sampled auto-calibration signals (ACS) using ESPIRiT, and usually normalized to satisfy:

$$\sum_{i=1}^{N_c} S_i^H S_i = I_N, \tag{2}$$

where $I_N$ denotes the identity matrix and $[\ ]^H$ is the adjoin operation.

Reconstructing the desired image from under-sampled accelerated k-space data by solving the inverse problem of Equation (1) is ill-posed due to the information loss in the forward sampling operation. Model-based CS-MRI utilizes prior knowledge about the properties of the underlying image to constrain the solution space, which can be formulated as:

$$\hat{x} = \arg\min_x \|Ax - \tilde{y}\|_2^2 + \lambda R(x), \tag{3}$$

where the former term takes into account the physics of MR acquisition to ensure consistency with the acquired k-space data, while the latter term imposes predefined constraints (e.g., sparsity, low-rank, and dictionary learning). The regularization parameter $\lambda \geq 0$ balances the influence of the imposed prior. In contrast, deep learning-based CS-MRI transcends model-based CS-MRI approaches by learning a data-adaptive prior.

Parallel MRI reconstruction can also be posed as a k-space interpolation problem by exploiting correlations among neighboring data. The correlations are often derived from dense-sampled ACS data and applied to estimate missing values. Given the estimated k-space correlations G, reconstruction can be obtained by solving an optimization problem:

$$\hat{y} = \operatorname*{argmin}_{y} \|My - \tilde{y}\|_2^2 + \lambda \|(G-I)y\|_2^2, \tag{4}$$

where the former term is to enforce data fidelity with the acquired samples and the latter term is to ensure the reconstruction satisfies the constraints G, and $\lambda$ is a trade-off parameter.

Embodiments of the present disclosure relate to a novel unrolling-based consistency-aware multi-prior network for accelerated MRI reconstruction. Some embodiments effectively address the challenges posed by existing methods by integrating parallel imaging MRI and compressed sensing MRI techniques within the deep learning framework to jointly utilize image, k-space, and calibration priors. By collaboratively learning these diverse priors in a data-driven fashion, the described network captures their complementary properties for robust MRI reconstruction, even in the presence of data imperfections. One of the network's advantages is that it incorporates data-adaptive self-consistent calibration priors to provide guidance for modeling consistency-aware k-space correlations, ensuring consistent interpolation of missing data. Some embodiments maximize the utilization of calibration information by leveraging the end-to-end learning capability of networks.

Moreover, embodiments may employ a frequency fusion layer to reap the benefits of image and k-space prior knowledge by aggregating their outputs in the frequency domain. This allows error back-propagation to the specific prior to facilitate the learning of their distinct properties, achieving a better trade-off between artifact removal and fine details preservation, particularly at high acceleration rates. Furthermore, the network sequentially explores adjacent slice redundancy across image and k-space domains to capture inherent intra- and inter-slice features, facilitating the learning of enhanced image, k-space, and calibration priors. In particular, a surface data fidelity layer is described to prevent back-propagated errors of imperfect data from affecting the learning of k-space and calibration priors during the exploration of adjacent slice information.

Some embodiments may consider parallel MRI reconstruction as a learnable multi-prior optimization problem, where the general formulation can be written as:

$$\hat{x} = \operatorname*{argmin}_{x} \|Ax - \tilde{y}\|_2^2 + \sum_{l=1}^{L} \lambda_l P(D_l x; \theta_l), \tag{5}$$

where $D_l$ represents an arbitrary domain transform operator, $P(D_l x; \theta_l)$ is a data-adaptive prior with learnable parameter $\theta_l$ that incorporates learned knowledge about the desired image in the specific transform domain $D_l$, and $\lambda_l$ is a trade-off parameter that balances the influence of the imposed prior and the fidelity of the acquired data. Equation (5) is the general formulation for equations (3) and (4), which only single prior knowledge of the desired image properties in spatial or k-space domain is considered.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 shows convergence trajectories of single-prior and multi-prior reconstructions for single and multi-prior constraints, respectively. With the visualization of the convergence trajectories of single-prior and multi-prior reconstructions, it can be observed that searching for the optimal reconstruction with a single prior constraint is challenging due to the existence of numerous feasible sets within that solution space. Accordingly, the single-prior convergence trajectory often ends up in a local minimum and is susceptible to conditions like an initial point and noise, especially in the scenario of rapid accelerated MRI. On the other hand, with multi-prior collaborative intervention for the optimization pathway, the local minimum can be effectively avoided, resulting in a more determinate solution space. Therefore, the synergy of multi-prior constraints can lead to a stable convergence trajectory and a better reconstruction.

Figure 2:
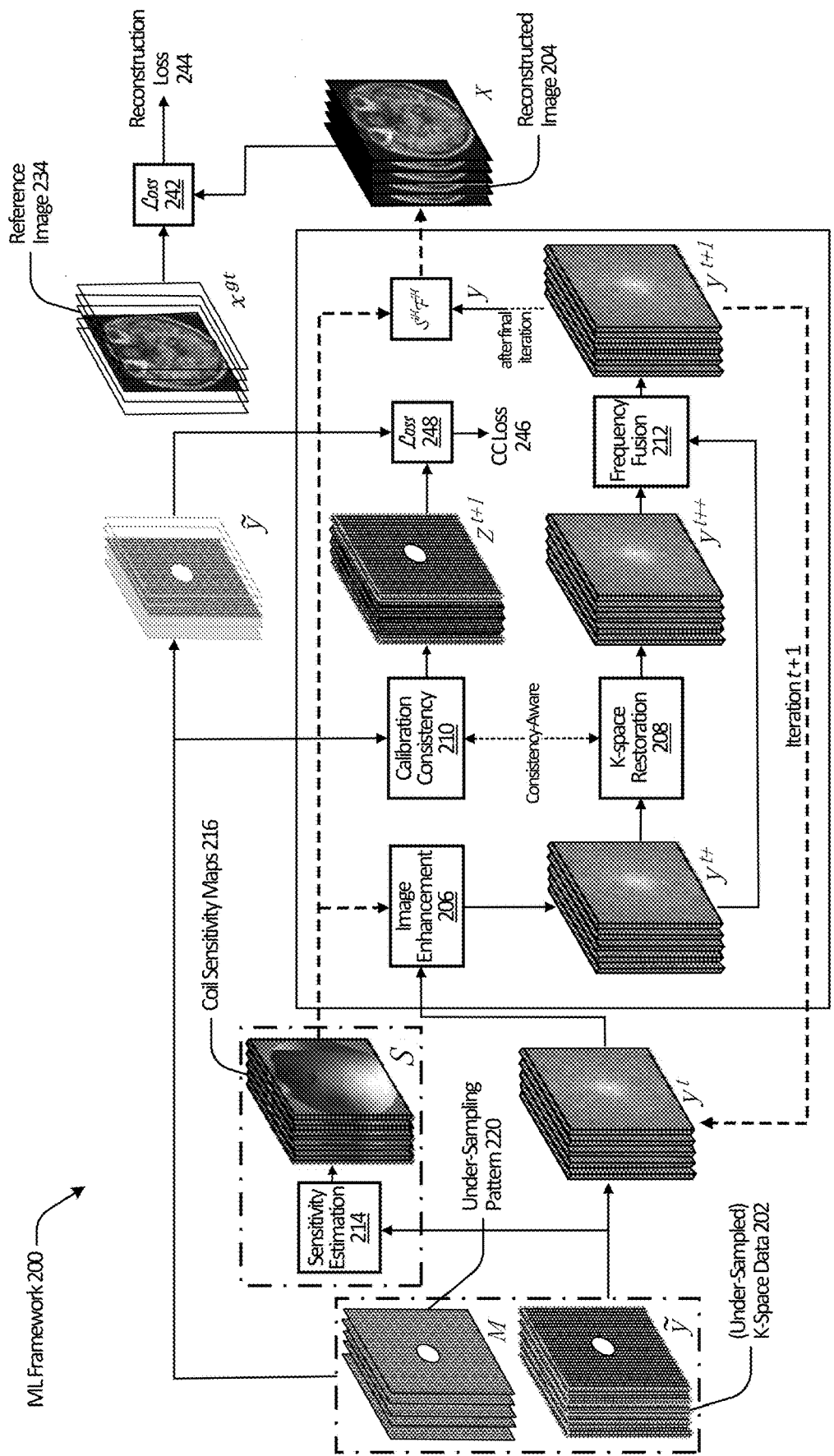
FIG. 2 shows an example architecture for a consistency-aware multi-prior collaborative machine-learning (ML) framework for accelerated MRI reconstruction.

FIG. 2 shows an example architecture for a consistency-aware multi-prior collaborative machine-learning (ML) framework 200 for accelerated MRI reconstruction, in accordance with some embodiments of the present disclosure. In some examples, ML framework 200 performs an iterative parallel MRI reconstruction process. The inputs to ML framework 200 include under-sampled k-space data 202, which may be zero-filled under-sampled multi-coil k-space data, and under-sampling pattern 220. ML framework 200 then progressively reconstructs a reconstructed image 204 using an image enhancement module 206 (IEM), a k-space restoration module 208 (KRM), a calibration consistency module 210 (CCM), and a frequency fusion module 212 (FFM). In some examples, a set of coil sensitivity maps 216 are estimated based on under-sampled k-space data 202 using a sensitivity estimation module 214. ML framework 200 unrolls the multi-prior optimization process into a cascaded deep network and utilizes data fidelity, data-driven, and prior modules to infuse knowledge extracted from sense-like images, multi-coil k-space data, and densely sampled calibration signals.

In some examples, data redundancy between adjacent MRI frames is explored across the framework for enriching contextual information to facilitate prior learning and improve reconstruction quality. Moreover, the proposed method allows an on-the-fly estimation of coil sensitivity maps 216 using sensitivity estimation module 214 instead of acquiring them from the pre-scan or offline computed results. Sensitivity maps 216 are used by ML framework 200 during each iterative learning process. Consequently, the consistency-aware priors are mutually constrained and collaboratively learned with coil sensitivity maps 216 in an end-to-end manner for producing high-quality reconstruction.

The steps of the iterative parallel MRI reconstruction process are illustrated in Algorithm 1 below. The process takes zero-filed multi-coil k-space samples with the corresponding sampling pattern as inputs to restore the desired image reconstruction progressively over T iterations. To initiate each (t)-th iteration of the iterative learning process, image enhancement module 206 is used to extract image prior knowledge from coil-combined images by generating intermediate artifact-free k-space data $y^{t+}$ from the previous output $y^t$. By prioritizing the learning process of image priors compared to k-space priors, the adverse impact from missing data on learning k-space correlations can be mitigated. Such enhanced data then serves as a stable initial point for k-space restoration module 208 to restore high-frequency components with imposed k-space knowledge.

K-space restoration module 208 utilizes information from multi-coil complex images and k-space correlations to obtain missing data from neighboring k-space data. Additionally, ML framework 200 leverages calibration consistency module 210 to embed calibration information from ACS and propagates consistent representations to force k-space restoration module 208 to learn trustworthy neighborhood relationships, and vice-versa. Moreover, at the end of each iteration, the information flows of image enhancement module 206 (which outputs $y^{t+}$) and k-space restoration module 208 (which outputs $y^{t++}$) interact via frequency fusion module 212, combining their mutual advantages for improved reconstruction.

By combining the strengths of multiple priors, the reconstruction $y^{t+1}$ is generated by frequency fusion module 212 by selectively fusing low-/high-frequencies of the intermediate results $y^{t+}$ and $y^{t++}$. Calibration consistency module 210 explicitly learns calibration features from the fully-sampled ACS data during training. Although its output $z^{t+1}$ does not directly contribute to the reconstruction $y^{t+1}$ during inference, the scan-specific calibration prior implicitly imposes constraints to enforce feature consistency for k-space restoration module 208 during the multi-prior collaborative learning stage. Finally, ML framework 200 generates a final reconstructed image 204 by applying coil combination techniques, such as the Root Sum of Squares (RSS) or sensitivity-like projection, to the output k-space data $y^{t+1}$ of the final iteration.

number of slices and coils, and $k_y$, $k_x$, $i_y$, $i_x$ denote the matrix size in the y-axis (k-space), x-axis (k-space), y-axis (image), and x-axis (image), respectively. The target slice $\tilde{y}_s$ and its m-adjacent slices (AS) on each side can be expressed as $(\tilde{y}_{s-m}, \ldots, \tilde{y}_{s-1}, \tilde{y}_s, \tilde{y}_{s+1}, \ldots, \tilde{y}_{s+m})$, and the corresponding coil-combined adjacent image slices is $(\tilde{x}_{s-m}, \ldots, \tilde{x}_{s-1}, \tilde{x}_s, \tilde{x}_{s+1}, \ldots, \tilde{x}_{s+m})$.

3D convolution kernels are utilized for image enhancement module 206, k-space restoration module 208, calibration consistency module 210, and sensitivity estimation module 214 to capture contextual information from the 2m+1 consecutive slices. The multiple slices are concatenated in the depth dimension, while multiple coils are stacked in the channel dimension for convolution. This enables ML framework 200 to learn intra- and inter-slice features for all priors throughout the iterative optimization. Notably, during training, only the center slice may require supervision, while its adjacent slices can benefit from the learned priors automatically.

Figure 3:
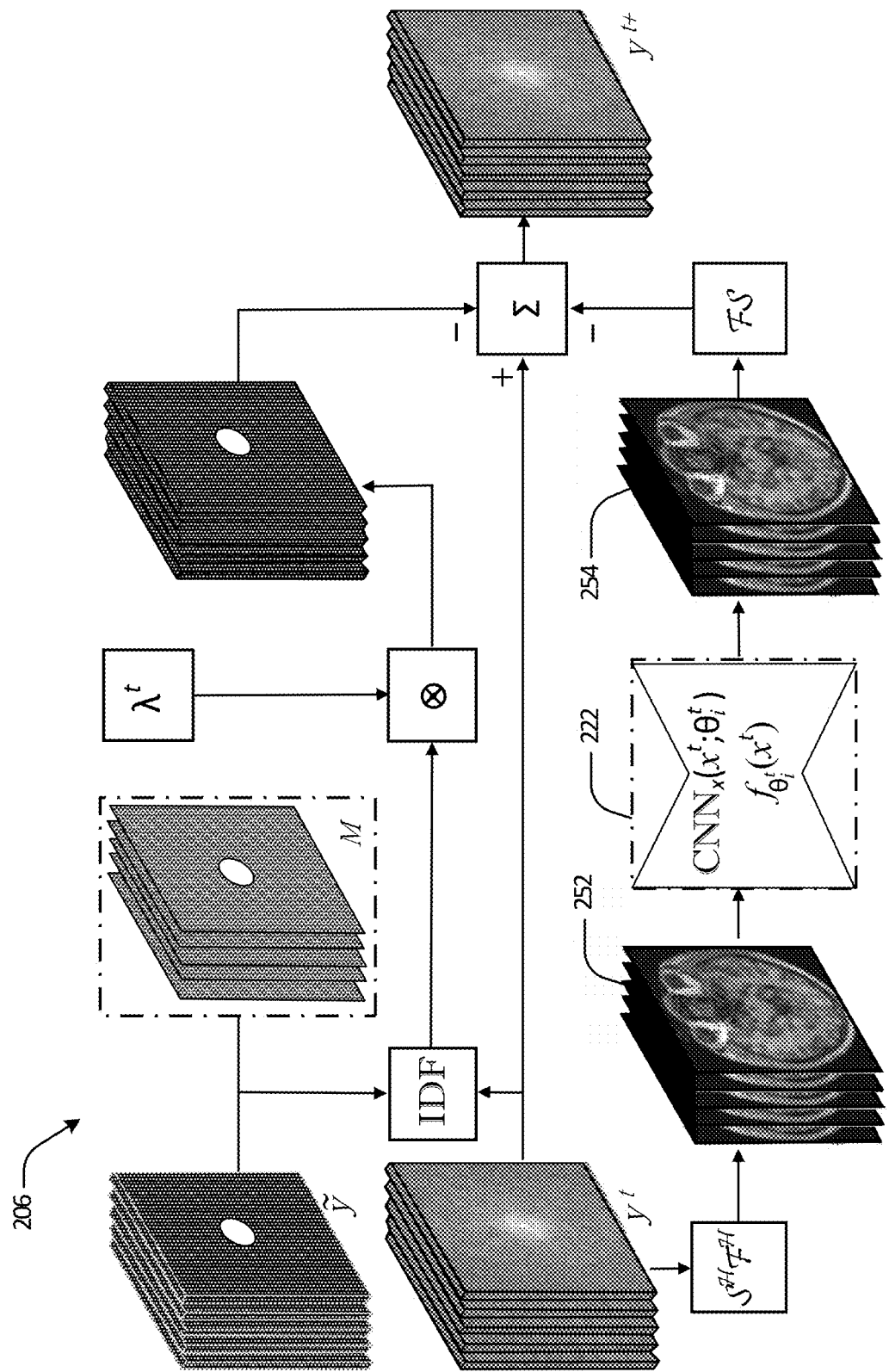
FIG. 3 shows an example architecture of an image enhancement module.

FIG. 3 shows an example architecture of image enhancement module 206, in accordance with some embodiments of the present disclosure. Image enhancement module 206 can analyze the underlying properties of coil-combined images by learning data-adaptive prior in the spatial domain. It restores the overall anatomical structure from degraded data by assuming desired image properties. Accordingly, image enhancement module 206 is capable of generating noise-free images and providing complete k-space signals for the subsequent k-space restoration process, especially at high acceleration factors.

It can be observed that image enhancement module 206 adopts an unrolled gradient descent (GD) algorithm to update the multi-coil k-space data of the previous iteration by ensuring data fidelity with the acquisition data and imposing image prior constraints on sense-like images. Instead of adopting handcrafted prior knowledge to force the images to satisfy desired properties, a convolutional neural network (CNN) 222 ($\mathbb{CNN}_x(x;\theta_i)$) is utilized to explore image features to learn data-adaptive prior through the

---

Algorithm 1-Algorithm for Consistency-Aware Multi-Prior Collaborative Learning Framework
Input: $\tilde{y}$ the under-sampled multi-coil k-space samples with adjacent frames augmented, M
    the binary sampling pattern, $M_k$ the surface mask for $\mathbb{KRM}$, $M_c$ the surface mask for $\mathbb{CC}_M$,
    and T the unroll iteration
Output: x the reconstructed image
$y^0 = \tilde{y}$; // zero-filled multi-coil k-space data initialization
$S = \mathbb{SEM}(y^0; \theta_s^t)$; // coil sensitivity maps estimation
for t = 0 to T − 1 do
    $y^{t+} = \mathbb{IEM}(y^t, \tilde{y}, M, S; \theta_i^t)$; // image enhancement
    $y^{t++} = \mathbb{KRM}(y^{t+}, M_k; \theta_k^t)$; // k-space restoration
    $z^{t+1} = \mathbb{CCM}(\tilde{y}, M_c; \theta_c^t)$; // calibration consistency
    $\theta_c^t \longleftrightarrow \theta_k^t$; // weight sharing mechanism
    $y^{t+1} = \mathbb{FFM}(y^{t+}, y^{t++}, M)$; // frequency fusion
end for
return $x = S^H F^H y^T$; // final reconstructed image

---

Exploring data redundancy between the target slice and its adjacent slices benefits image reconstruction as nearby images often have continuous anatomical structures. The continuity of image content in adjacent slices implies that adjacent k-space data often share similar information, leading to improved reconstruction. Given a volume of under-sampled multi-coil k-space data $\tilde{y}_{vol} = (\tilde{y}_1, \ldots, \tilde{y}_{ns})$ with a matrix dimension of (ns, nc, $k_y$, $k_x$), the corresponding coil-combined image volume is $\tilde{x}_{vol} = (\tilde{x}_1, \ldots, \tilde{x}_{ns})$ with a matrix dimension of (ns, $i_y$, $i_x$). Here, ns and nc represent the back-propagation from training datasets. In the illustrated example, the (t)-th iteration k-space data is converted from the frequency domain to the spatial domain (e.g., using an inverse-Fourier transform) to produce input image-space data 252, which is provided as input to CNN 222 to generate output image-space data 254.

The learned spatial domain prior $P(x;\theta_i)$ is applied to enforce the image to satisfy desired properties. The update formula of this module at the (t)-th iteration ($0 \leq t < T$) can be expressed as:

$$y^{t+} = \mathbb{IEM}(y^t, \tilde{y}, M, S; \theta_i^t) \quad (7)$$
$$= y^t - \eta^t \left( FS\mathbb{CNN}_x(S^H F^H y^t; \theta_i^t) + \lambda^t(My^t - \tilde{y}) \right)$$
$$= y^t - \eta^t \left( FS f_{\theta_i^t}(S^H F^H y^t) + \lambda^t(My^t - \tilde{y}) \right)$$

where $\theta_i^t$, $y^t$, $\eta^t$, and $\lambda^t$ denote the network parameters of $f_{\theta_{isi}}$, initial multi-coil k-space data, learning rate, learnable regularization parameter at the t-th iteration, respectively. In some examples, a U-Net architecture can be leveraged to learn a highly nonlinear image prior or, in other examples, the U-Net can be substituted with other image-based networks for better reconstruction. In some examples, a four-stage U-Net is extended to its 3D convolution version and is used as the network architecture for the $f_{\theta_i^t}$ of image enhancement module 206. This choice allows the power of a highly nonlinear model to be leveraged for learning a coil-combined image prior. Additionally, sensitivity estimation module 214 may adopt a similar architecture to model spatial information encoded in coil arrays for estimating the coil sensitivity maps.

Figure 4:
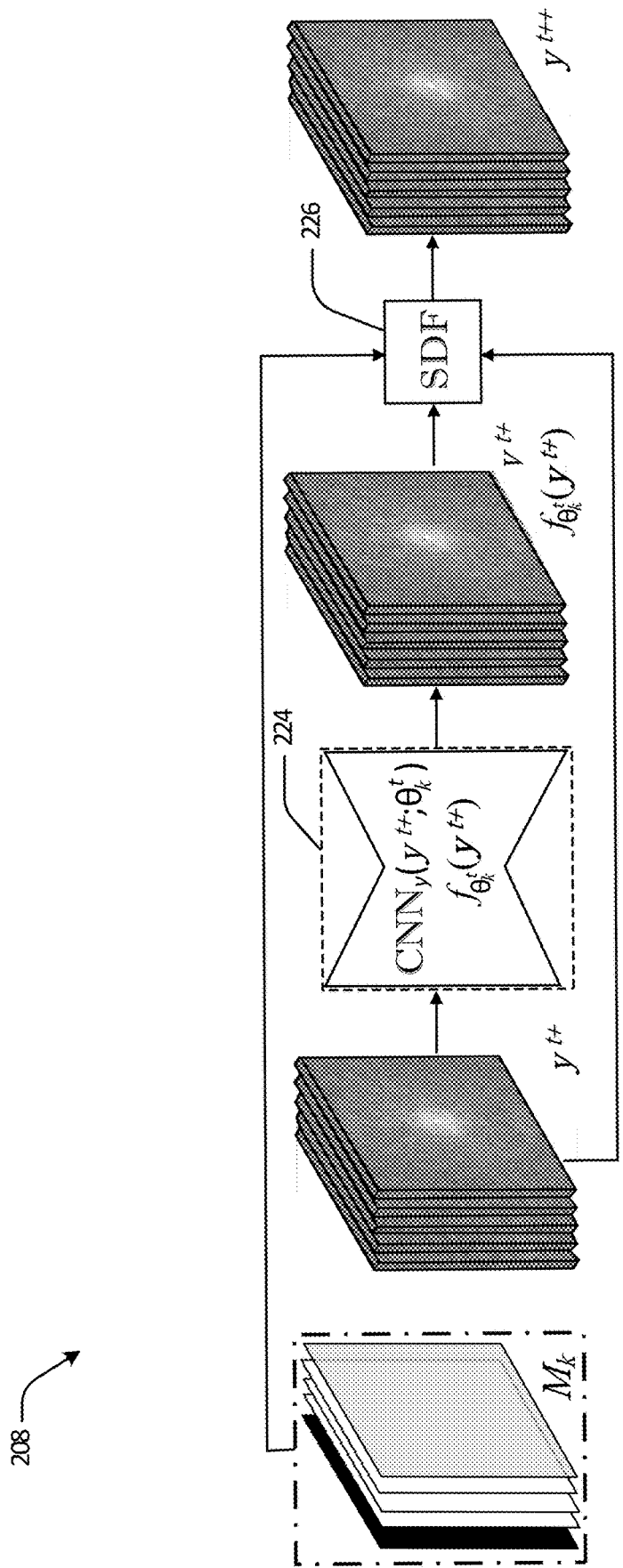
FIG. 4 shows an example architecture of a k-space restoration module.

FIG. 4 shows an example architecture of k-space restoration module 208, in accordance with some embodiments of the present disclosure. While image enhancement module 206 excels in removing noise and aliasing artifacts from degraded images, it often produces over-smoothed reconstructions at the loss of texture and structure details. The k-space data represent spatial frequencies of the MR image, in which each point contains a unique spatial frequency that spreads to the whole image. The over-smoothed reconstruction indicates that high-frequency signals of the image that represent textures and details are not well-preserved during the process. Exploring k-space correlations, on the other hand, has advantages in keeping high-frequency information.

To enrich details and textures for the over-smoothed reconstruction, k-space restoration module 208 is proposed to mine underlying relationships of frequency spectra to restore missing signals. It can be observed in FIG. 4 that the module consists of two major parts: (1) a CNN 224 ($\mathbb{CNN}_y(y;\theta_k)$) to reveal underlying multi-coil k-space correlations, and (2) a surface data fidelity layer 226 ($\mathbb{SDF}$) to reduce data imperfections. The update procedure of (t)-th iteration ($0 \leq t < T$) can be written as:

$$y^{t++} = \mathbb{KRM}(y^{t+}, M_k; \theta_k^t) \quad (8)$$
$$= \mathbb{SDF}(\mathbb{CNN}_y(y^{t+}; \theta_k^t), y^{t+}, M_k)$$
$$= \mathbb{SDF}\left(f_{\theta_k^t}(y^{t+}), y^{t+}, M_k\right)$$

Instead of adopting fixed kernels to apply constraints on trained models for improving high-frequency image features, a convolutional neural network $\mathbb{CNN}_y$ may be leveraged to learn data-adaptive k-space priors from scratch through the reconstruction process. There are many advantages of using complex-valued convolutional networks for MRI reconstruction. In some examples, CNN 224 stacks four complex-valued convolutional layers with 3×3 kernels to capture k-space correlations from the complex-valued multi-coil MRI data. Two real-valued convolutions are used to realize a complex-valued convolution, which can be expressed as:

$$\mathbb{C}Conv(u) = \quad (9)$$
$$(Conv_r(\mathfrak{R}(u)) - Conv_i(\mathfrak{J}(u))) + i(Conv_r(\mathfrak{J}(u)) + Conv_i(\mathfrak{R}(u))),$$

where u represents a complex number. It can be observed based on the architecture of $\mathbb{CNN}_y$ that for the (t)-th iteration, $y^{t+}$ forms the input and the output is refined intermediate data $v^{t+}$:

$$v^{t+} = \mathbb{CNN}_y(y^{t+}; \theta_k^t) \quad (10)$$
$$= f_{\theta_k^t}(y^{t+})$$

CNN 224 utilizes padding operations to preserve intra- and inter-frame image resolution during 3D convolution. This often brings undesirable side effects due to introduced noisy signals of those surface areas, causing decreasing reconstruction performance. This problem is often ignored when processing data on the spatial image domain, as only image surfaces are affected, leading to a minor decrease in MRI reconstruction quality. However, extra care may be required when applying padding operations on k-space data to preserve resolution, as noisy signals can lead to inaccurate interpretation of underlying k-space relationships using CNN 224 spreading imperfect frequency prediction to the entire image. In exploring adjacent frame contextual information scenarios, those introduced noisy signals, due to the padding along the frame dimension, can become barriers for capturing underlying inter-frame correlations. Extending the area along frames introduces enormous imperfect data pairs, which can degenerate or may even break down the intrinsic k-space data correlation among frames.

In some embodiments, a surface data fidelity layer 226 ($\mathbb{SDF}$) may be employed to reduce the influence of noisy data around the surface for facilitating inherent k-space correlation mining. Layer 226 cleans noisy signals within surface regions by imposing data consistency with image-enhanced k-space data over the areas. For the (t)-th iteration, the formula for $\mathbb{SDF}$ is:

$$\mathbb{SDF}(v^{t+}, y^{t+}, M_k) = M_k v^{t+} + (1 - M_k) y^{t+}, \quad (11)$$

where $M_k$ is a binary mask for k-space restoration module 208 defining noise-untainted areas and $$v^{t+} = f_{\theta_k^t}(y^{t+}).$$

frames to be excluded. The size of the boundaries is set to the accumulated padding size of the network. While the number of adjacent frames to be excluded is an experimental parameter, an example of $M_k$ with two outermost frames excluded is illustrated in FIG. 8G. Accordingly, k-space restoration module 208 recovers high-frequency components for untainted areas while acting like an identical path for imperfect data.

Figure 5:
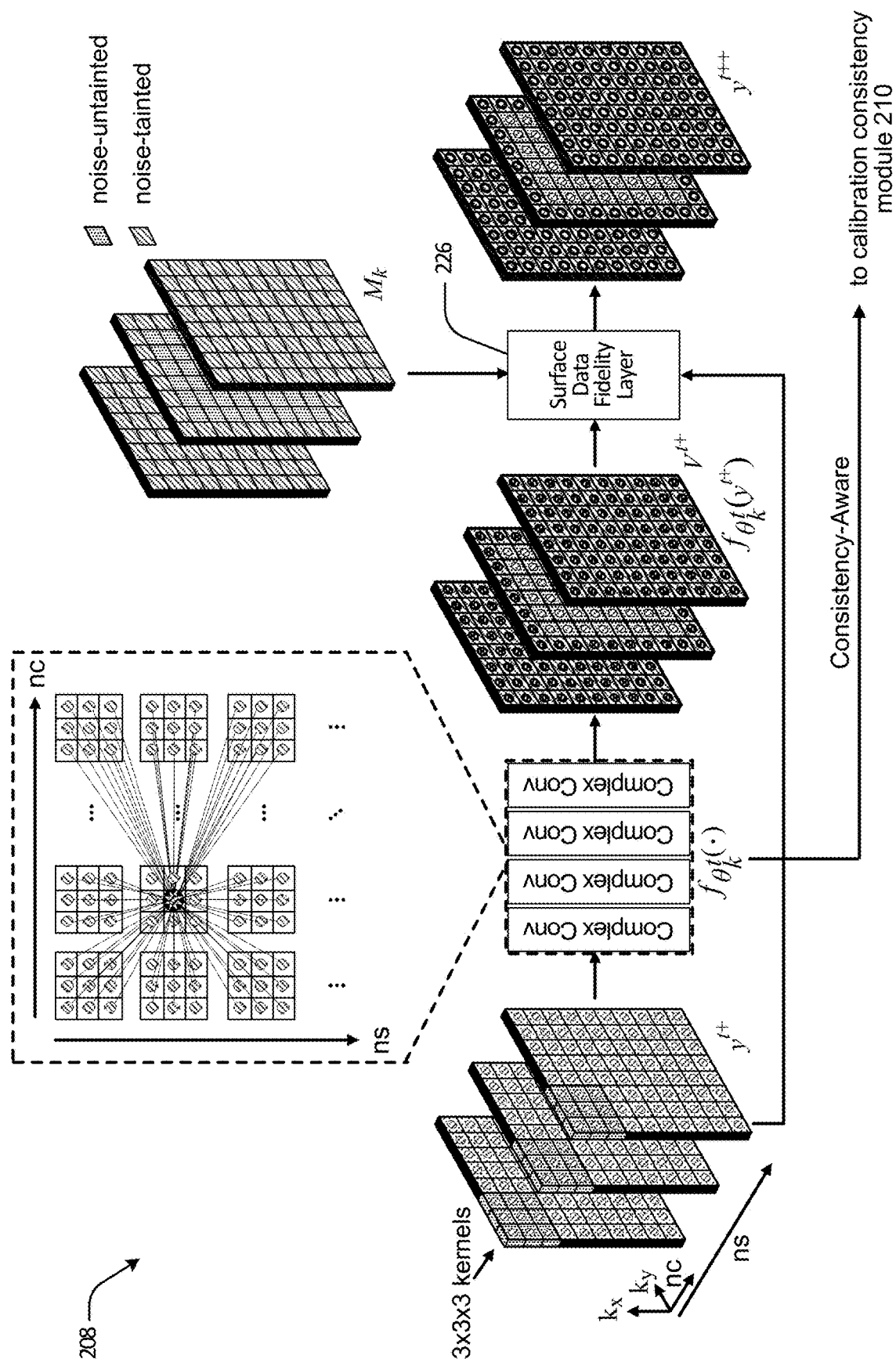
FIG. 5 shows an example architecture of a k-space restoration module.

FIG. 5 shows an example architecture of k-space restoration module 208, in accordance with some embodiments of the present disclosure. In the illustrated example, the network comprises four complex-valued 3D convolution layers that use 3×3×3 kernels to extract features from k-space data, where the number of coils (nc) and slices (ns)

are considered as the feature and depth dimensions, respectively. It should be noted that data for each coil may be estimated using information from all coils (channels), and that each coil contains 3D volume information. This allows the network to capture complex intra- and inter-slice multi-coil features for k-space refinement and effectively enhance high-frequency information in the reconstructed images. As shown in FIG. 5, surface data fidelity layer 226 enforces hard data fidelity with the image enhanced intermediate, denoted as $y^{t+}$, over the imperfect surfaces while keeping noise-untainted data unchanged in refined results, denoted as $$f_{\theta_k^t}(y^{t+}).$$

Figure 6:
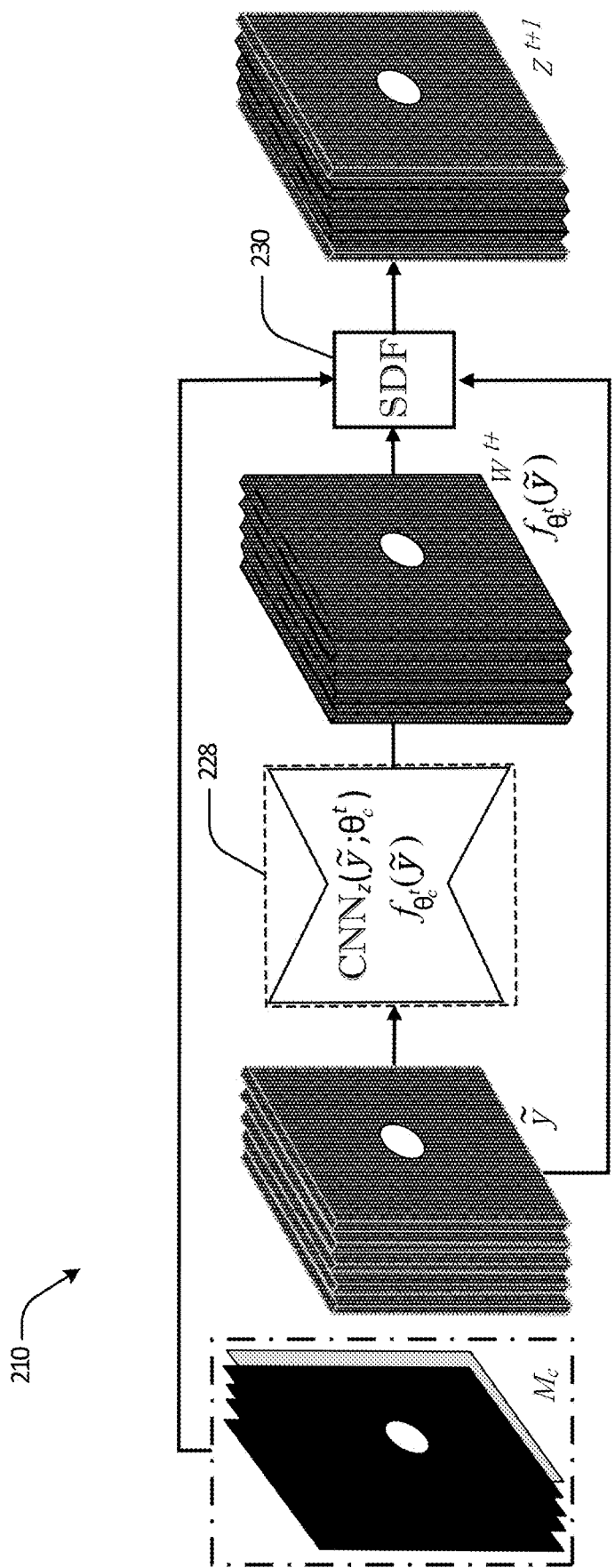
FIG. 6 shows an example architecture of a calibration consistency module.

FIG. 6 shows an example architecture of calibration consistency module 210, in accordance with some embodiments of the present disclosure. Relying solely on k-space prior knowledge learned from the image-enhanced intermediate could cause inaccurate interpolation, resulting in inconsistencies in the reconstructed data. To address this limitation, calibration consistency module 210 ($\mathbb{CCM}$) is used to infuse calibration information into the network by learning scan-specific features embedded in ACS data in an end-to-end manner. In some examples, calibration consistency module 210 leverages a CNN 228 to extract calibration information and to implicitly impose such prior knowledge to enforce k-space restoration module 208 to forecast consistent k-space data. It may consist of a complex network $\mathbb{CNN}_z$ to extract scan-specific correlations from ACS data and a surface data fidelity layer 230 ($\mathbb{SDF}$) to ensure data consistency with acquisition samples in noisy surface regions. The update procedure of this module for the (t)-th iteration ($0 \leq t < T$) can be written as:

$$\begin{aligned} z^{t+1} &= \mathbb{CCM}(\tilde{y}, M_c; \theta_c^t) \qquad (12) \\ &= \mathbb{SDF}(\mathbb{CNN}_z(\tilde{y}; \theta_c^t), \tilde{y}, M_c) \\ &= M_c f_{\theta_c^t}(\tilde{y}) + (1 - M_c)\tilde{y} \end{aligned}$$

where $\theta_c^t$ is the network parameters of $f_{\theta_c^t}$ at the t-th iteration and $M_c$ is a surface mask for calibration consistency module 210 that indicates valid calibration regions.

In some examples, $\mathbb{CNN}_z$ may have the same architecture as $\mathbb{CNN}_y$. However, it utilizes distinct inputs and serves different objectives. For example, $\mathbb{CNN}_z$ is designed to reveal multi-coil k-space correlations from ACS data. The network parameters (e.g., weights) of these two networks are shared within the same unrolled iteration. Accordingly, they mutually impose learned priors to collaboratively unveil inherent k-space correlations.

In some instances, the influence of noisy data around the surface of ACS data can cause $\mathbb{CNN}_z$ to learn inaccurate k-space correlations, as no signals can be operated on to synthesize the surface points. The proposed $\mathbb{SDF}$ focuses on effective ACS regions and excludes noisy data during network back-propagation to prevent suffering from such impacts. As a result, the $\mathbb{SDF}$ learns to predict ACS data in the noise-untainted regions while imposing data consistency with the input in other areas. For the (t)-th iteration, the formula for $\mathbb{SDF}$ is:

$$\mathbb{SDF}(w^{t+}, \tilde{y}, M_c) = M_c w^{t+} + (1 - M_c)\tilde{y}, \qquad (13)$$

where $M_c$ is a binary mask that indicates valid ACS regions. An example of $M_c$ with two outermost frames excluded is illustrated in FIG. 8F.

Figure 7:
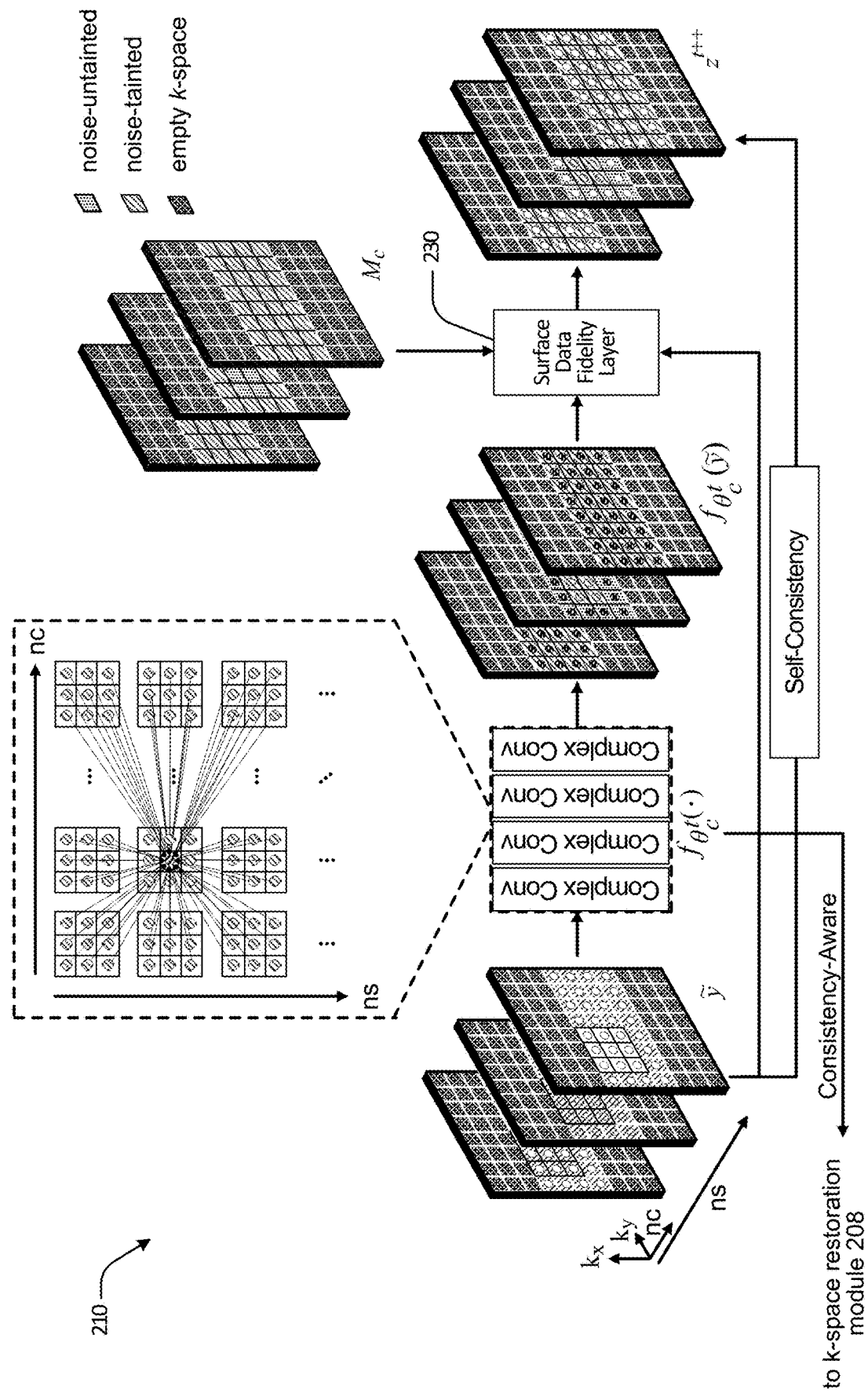
FIG. 7 shows an example architecture of a calibration consistency module.

FIG. 7 shows an example architecture of calibration consistency module 210, in accordance with some embodiments of the present disclosure. In the illustrated example, calibration consistency module 210 takes a set of consecutive slices of the multi-coil ACS data as input and attempts to predict the input itself through self-consistency constraint. This process allows shift-invariant k-space correlations to be extracted from the fully-sampled ACS region. These scan-specific features are then used to guide k-space restoration module 208 in learning consistency-aware k-space correlations. Infusing calibration prior knowledge learned from the calibration consistency module 210 enables k-space restoration module 208 to learn complementary features from both ACS data and the image-enhanced intermediate information, allowing consistent k-space data prediction for both acquired and missing data.

Calibration consistency module 210 may share the same architecture as k-space restoration module 208, but with different inputs and purposes. Via the consistency-aware path, network parameters are shared between the modules, allowing learned priors to impose constraints collaboratively and reveal inherent k-space correlations. However, as mentioned earlier, padding operations can introduce artificial signals to the surface regions of the ACS data volume, resulting in inaccurate calibration information embedding. To address this issue, surface data fidelity layer 230 selectively focuses on the inner calibration regions of the ACS data volume while excluding its surface regions during network back-propagation.

Image enhancement module 206 and k-space restoration module 208 play different roles in the framework. For example, image enhancement module 206 is capable of restoring accurate low-frequency features from the spatial domain to generate an artifact-free reconstruction, while k-space restoration module 208 is good at probing invisible features to preserve high-frequency signals in the frequency domain. To absorb the benefits of both modules, frequency fusion module 212 ($\mathbb{FFM}$) can be used to combine their predictions for high-quality MRI reconstruction. The fusion process of this module at the (t)-th iteration can be expressed as:

$$\begin{aligned} y^{t+1} &= \mathbb{FFM}(y^{t+}, y^{t++}, M) \qquad (14) \\ &= My^{t+} + (1 - M)y^{t++}, \end{aligned}$$

where $y^{t+1}$ denotes the final output of the t-th iteration which is selected from the spatial domain enhanced data $y^{t+}$ and the k-space refined reconstruction $y^{t++}$ using the sampling mask M. Consequently, forward information from two branches is merged in each iteration throughout the framework to ensure the reconstruction has fine textures and details. Meanwhile, the backward information flow is divided in frequency fusion module 212 to force modules 206 and 208 to focus on their intended tasks.

Figure 8A:
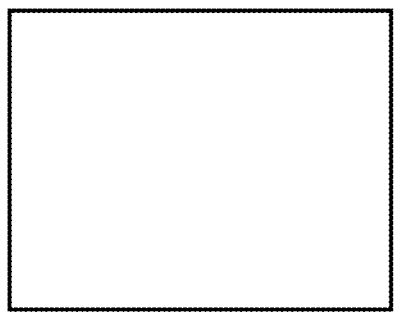
FIGS. 8A-8G show examples of binary masks.
Figure 8B:
Figure 8C:
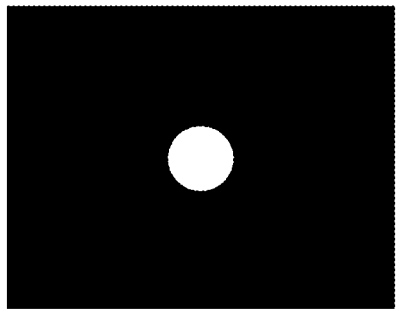
Figure 8D:
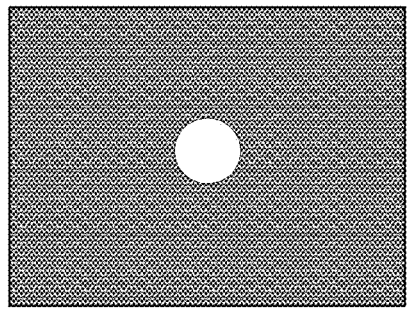
Figure 8E:
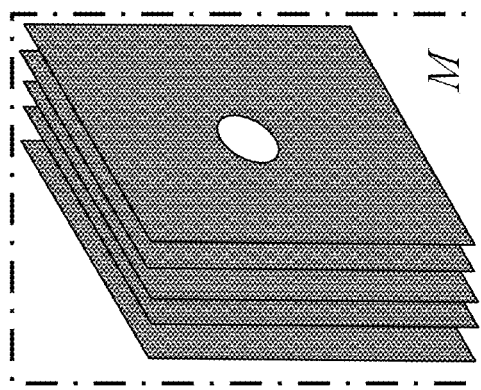
Figure 8F:
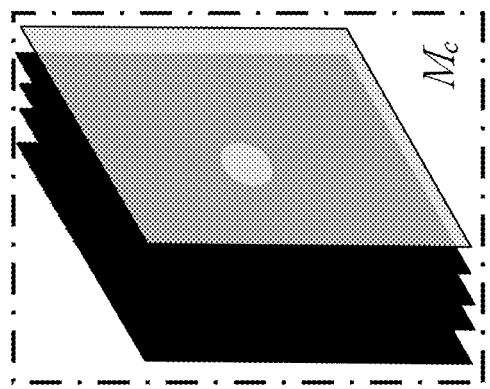
Figure 8G:
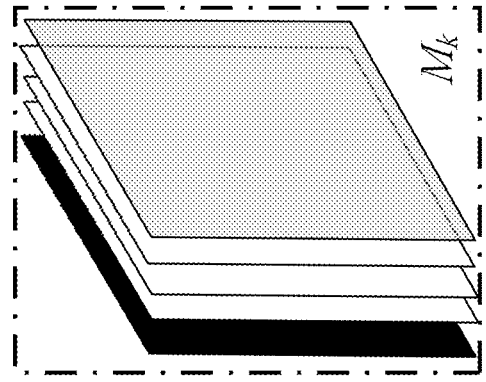

FIGS. 8A-8G show examples of binary masks. In the illustrated examples, white color indicates a value of 1 and black indicates a value of 0. FIG. 8A shows a 2D Poisson disc sub-sampling mask with fully sampled ACS data within a radius of 16. FIG. 8B shows a deflation center mask with reduced ACS regions. FIG. 8C shows an inter-frame mask that removes noisy data across frames. FIG. 8D shows an intraframe mask that removes noisy boundaries within a frame. FIG. 8E shows 2D Poisson masks for consecutive 2-adjacent frames. FIG. 8F shows $M_c$ for calibration consistency module 210 which consists of two inter-frame masks on the sides and three deflation center masks in the middle. FIG. 8G shows $M_k$ for k-space restoration module 208 which contains two inter-frame masks on the sides and three inter-frame masks in the middle.

As described above, ML framework 200 receives under-sampled k-space data as input and outputs a fully-sampled k-space estimation y at the last iteration. The final coil-combined image, reconstructed image 204, is obtained by applying coil combination techniques on this k-space data, such as the RSS reconstruction or the sensitivity-like projection. The difference between reconstructed image 204 and a reference image 234 is minimized using the $L_1$ and Structural Similarity Index Measure (SSIM) loss functions at loss block 242, which computes a reconstruction loss 244. The output of ML framework 200 becomes a set of adjacent frames when contextual information is embraced into the reconstruction. In this situation, only the reference image of the target frame is required to provide full supervision. The remaining frames can be progressively refined without supervision during learning. Consequently, the contextual information of adjacent frames is gradually increased throughout the network.

Additionally, the framework also intends to infer acquisition data from calibration consistency module 210. To facilitate k-space restoration module 208 to learn calibration consistent coefficients, an $L_1$ loss function is used to calculate a calibration consistency loss 246 at loss block 248 to minimize the difference between the inferred acquisition data and the acquired measurements in each iteration.

Reconstruction loss 244 and calibration consistency loss 246 are cooperated to optimize the framework jointly for high-quality reconstruction. The final loss can be expressed as follows:

$$\mathcal{L} = \lambda_1 \mathcal{L}_{recon} + \lambda_2 \mathcal{L}_{calib} \quad (15)$$

where $\lambda_1$ and $\lambda_2$ are multiplying factors to balance two kinds of losses. In some examples, for simplicity, both multiplying factors are set to 1.0. In some examples, calibration consistency loss 246 can be expressed as $\gamma_t \mathcal{L}_{L_1}(z^t, \tilde{y})$ and reconstruction loss 244 can be expressed as $\alpha \mathcal{L}_{L_1}(x^*, x^{gt}) + \beta \mathcal{L}_{SSIM}(x^*, x^{gt})$ where $x^*$ and $x^{gt}$ represent the RSS or sensitivity-like reconstruction and the reference image, respectively, with the final loss can be expressed as follows:

$$\mathcal{L} = \alpha \mathcal{L}_{L_1}(x^*, x^{gt}) + \beta \mathcal{L}_{SSIM}(x^*, x^{gt}) + \Sigma_{t=1}^{T} \gamma_t \mathcal{L}_{L_1}(z^t, \tilde{y}). \quad (16)$$

The trade-off parameters $\alpha$, $\beta$, and $\gamma_t$ ($1 \leq t \leq T$) may all be set to 1 during training for simplicity.

To evaluate the quality of reconstructed image 204, two conventional image reconstruction assessment metrics were used: the peak signal-to-noise ratio (PSNR) and the SSIM metric. The multi-coil brain MR raw data from the public Calgary-Campinas dataset was used, which includes three-dimensional (3D), T1-weighted, gradient-recalled echo, and 1 mm isotropic sagittal acquisitions, collected on a clinical MRI scanner. ML framework 200 was evaluated on the provided split sets, including 47 volumes (7332 axial slices) for training, 10 volumes (1560 axial slices) for validation, and 10 volumes (1560 axial slices) for testing. Each volume provides fully-sampled k-space data acquired using a 12-channel coil. Reconstructed images have 218×170/180 pixels. Acceleration factors 5 and 10 are evaluated using the Poisson disk distribution sub-sampling masks provided by the Calgary-Campinas MC-MRI Reconstruction Challenge.

The public SKM-TEA dataset consists of 155 patients at Stanford Healthcare who received a knee MRI with the 3D qDESS sequence on one of two 3T GE MR750 scanners. Among them, data from 36 patients who received additional arthroscopic surgical intervention were included in the test set. The remaining data were randomly split into 86 and 33 scans for training and validation, respectively. All complex raw k-space data (with real and imaginary channels) were acquired in a multi-coil setting (8 or 18 coils) with 2×1 parallel imaging with elliptical sampling. The fully-sampled k-space data was subsequently synthesized from those under-sampled measurements using ARC. Acceleration factors 6× and 8× are investigated using the provided under-sampling masks.

In the fastMRI dataset, the multi-coil knee MR raw data from the public fastMRI competition were utilized. It provides fully-sampled k-space raw data with 973 volumes (34742 slices) and 199 volumes (7135 slices) for training and validation, respectively. Additionally, a test set with 118 (4092 slices) under-sampled k-space volumes is provided for participants to unload their reconstruction results to the public leaderboard for algorithm comparison. All data were acquired using a 15-channel knee coil array and a Cartesian 2D TSE protocol. The dataset contains two types of MRI acquisition sequences: half with a Proton Density weighted sequence (PD) and another half with a Proton Density weighted sequence with Fat Saturation (PDFS). Acceleration factors 4× and 8× are online tested using the provided under-sampling masks.

All of models were optimized using the Adam optimizer with parameters $\beta_1=0.9$ and $B_2=0.999$. The initial learning rate was $3e^{-4}$ with a batch size of 1. Networks were trained for 30, 20, and 100 epochs with learning rates reduced by a factor of 10 after 20, 16, and 40 epochs for the Calgary-Campinas, SKM-TEA, and fastMRI datasets, respectively. The PyTorch Lightning framework was used for model implementation, and the training was performed on four NVIDIA RTX A6000 GPUs.

Table 1 shows example quantitative evaluation results on the Calgary-Campinas dataset at acceleration factors of 5× and 10×, with mean values shown outside parentheses and standard deviations shown inside parentheses. ML framework 200 was compared with several state-of-the-art methods, including U-Net, MultiDomainNet, KIKI-Net, XPD-Net, Joint-ICNet, E2EVarNet, RIM, LPDNet, IterDualNet, ConjGradNet, and RecurrentVarNet. ML framework 200 achieves the best reconstruction results among all the methods in both PSNR and SSIM, regardless of acceleration factors. At 10× acceleration, the improvement is even more significant. Comparing ML framework 200 to the best-published method, PSNR is higher by 0.39 at 5× acceleration and 0.75 at 10× acceleration. SSIM also shows consistent improvement results.

TABLE 1

|  | 5× | | 10× | |
| --- | --- | --- | --- | --- |
|  | PSNR | SSIM | PSNR | SSIM |
| U-Net | 29.77 (0.68) | 0.8769 (0.0095) | 27.86 (0.52) | 0.8283 (0.0141) |

TABLE 1-continued

| | 5× | | 10× | |
|---|---|---|---|---|
| | PSNR | SSIM | PSNR | SSIM |
| MultiDomainNet | 28.70 (0.63) | 0.8682 (0.0100) | 26.87 (0.64) | 0.8160 (0.0155) |
| KIKI-Net | 29.66 (0.73) | 0.8923 (0.0094) | 27.63 (0.71) | 0.8393 (0.0145) |
| XPDNet | 32.63 (0.42) | 0.9115 (0.0071) | 29.99 (0.55) | 0.8607 (0.0114) |
| Joint-ICNet | 32.52 (0.63) | 0.9118 (0.0093) | 29.79 (0.61) | 0.8638 (0.0148) |
| E2EVarNet | 33.69 (0.49) | 0.9210 (0.0068) | 30.24 (0.53) | 0.8689 (0.0114) |
| RIM | 35.24 (0.45) | 0.9348 (0.0061) | 32.10 (0.46) | 0.8969 (0.0087) |
| LPDNet | 35.71 (0.43) | 0.9388 (0.0061) | 32.51 (0.46) | 0.9052 (0.0085) |
| IterDualNet | 35.26 (0.39) | 0.9375 (0.0059) | 32.16 (0.40) | 0.9027 (0.0083) |
| ConjGradNet | 35.73 (0.42) | 0.9390 (0.0058) | 32.68 (0.42) | 0.9074 (0.0080) |
| Recurrent VarNet | 36.35 (0.39) | 0.9446 (0.0054) | 33.33 (0.40) | 0.9159 (0.0068) |
| ML Framework 200 | 36.74 (0.50) | 0.9476 (0.0058) | 34.08 (0.51) | 0.9265 (0.0070) |

Figure 9:
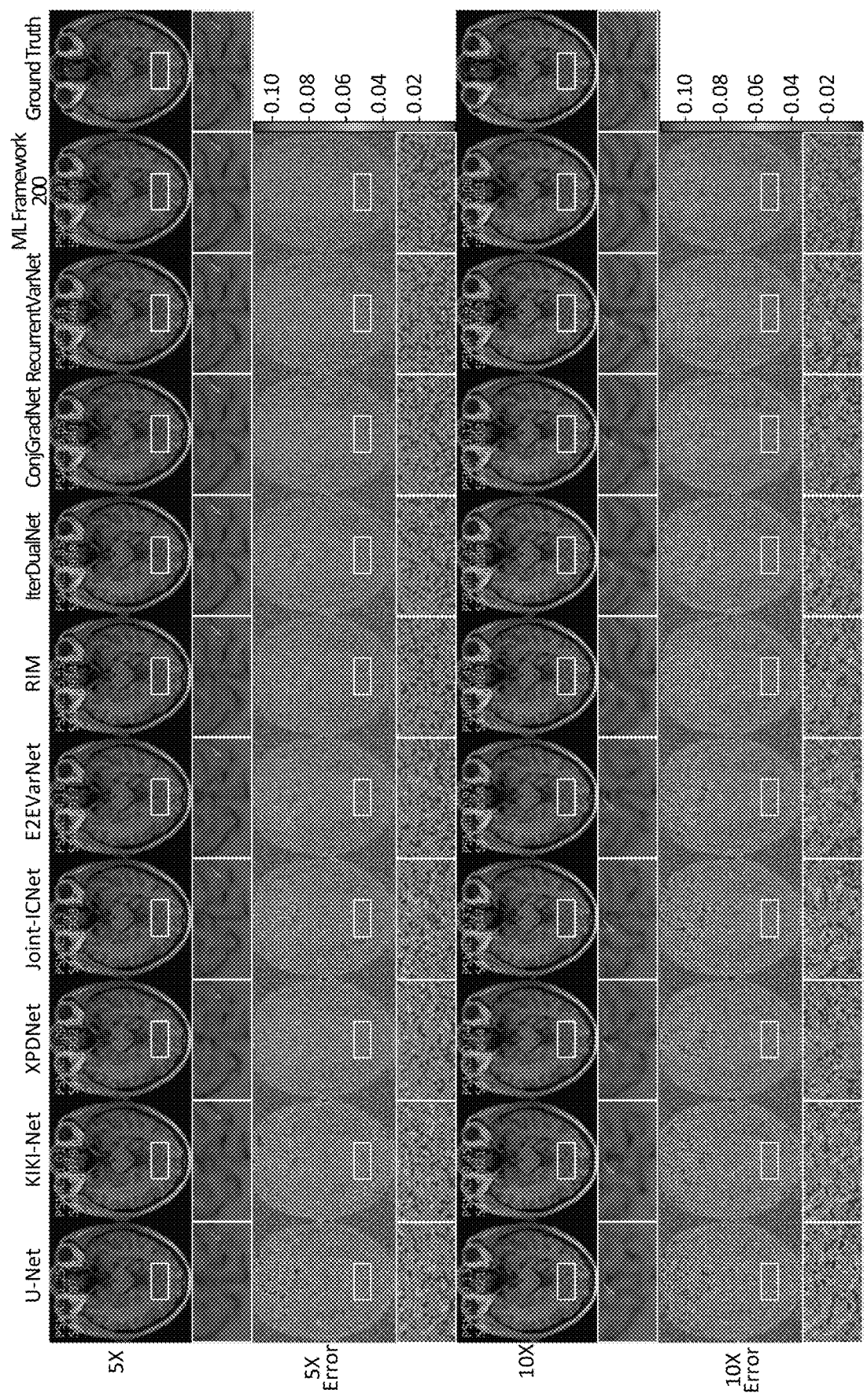
FIG. 9 shows representative reconstruction images and error maps at 5× and 10× accelerations.

FIG. 9 shows representative reconstruction images and error maps at 5× and 10× accelerations. Each image includes a zoomed-in view with highlighted regions of interest for detailed analysis. It can be observed that other models tend to generate blurry reconstruction images with missed details and even fail to restore anatomy structures, especially in a high acceleration scenario. However, ML framework 200 is able to restore high-frequency details and textures at both accelerations owing to the multi-prior collaborative learning strategy. It can also be observed that noise appears in the reference image due to incomplete data acquisition and MRI acquisition limitations. ML framework 200 can even remove the noise and generate a sharper and clearer reconstruction than the reference image, which may assist radiologists in disease diagnosis. These results demonstrate that the proposed method is cable of producing high-quality reconstruction for rapidly accelerated MRI images, especially the fine details. The error maps also show the consistent advantage of ML framework 200 over the others.

Table 2 shows quantitative evaluation results on the SKM-TEA dataset for echoes E1 and E2 at acceleration (Acc.) factors of 6× and 8×, with mean values shown outside parentheses and standard deviations shown inside parentheses.

TABLE 2

| Acc. | Model | PSNR ↑ E1 | PSNR ↑ E2 | SSIM ↑ E1 | SSIM ↑ E2 | NRMSE ↓ E1 | NRMSE ↓ E2 |
|---|---|---|---|---|---|---|---|
| 6× | U-Net (E1/E2) | 31.54 (1.38) | 33.68 (1.02) | 0.7652 (0.0273) | 0.7254 (0.0319) | 0.1919 (0.0248) | 0.3074 (0.0370) |
| | U-Net (E1 + E2) | 31.07 (1.38) | 33.16 (1.05) | 0.7687 (0.0244) | 0.7345 (0.0299) | 0.2022 (0.0222) | 0.3262 (0.0359) |
| | U-Net (E1⊕E2) | 31.10 (1.63) | 33.46 (1.02) | 0.7612 (0.0259) | 0.7296 (0.0341) | 0.2023 (0.0274) | 0.3152 (0.0351) |
| | Unrolled (E1/E2) | 35.03 (1.08) | 34.46 (1.09) | 0.8296 (0.0242) | 0.7607 (0.0309) | 0.1281 (0.0132) | 0.2817 (0.0385) |
| | Unrolled (E1 + E2) | 35.02 (1.07) | 34.48 (1.09) | 0.8384 (0.0222) | 0.7612 (0.0298) | 0.1283 (0.0135) | 0.2810 (0.0384) |
| | Unrolled E1⊕E2 | 35.01 (1.08) | 34.16 (1.08) | 0.8333 (0.0230) | 0.7563 (0.0298) | 0.1284 (0.0130) | 0.2911 (0.0359) |
| | ML Fra. 200 (E1/E2) | 36.30 (1.16) | 35.85 (1.15) | 0.9071 (0.0138) | 0.8497 (0.0282) | 0.1114 (0.0182) | 0.2402 (0.0349) |
| | ML Fra. 200 (E1 + E2) | 36.25 (1.14) | 35.87 (1.16) | 0.9063 (0.0135) | 0.8502 (0.0282) | 0.1120 (0.0174) | 0.2396 (0.0348) |
| | ML Fra. 200 (E1⊕E2) | 36.25 (1.21) | 35.92 (1.19) | 0.9062 (0.0140) | 0.8514 (0.0286) | 0.1121 (0.0188) | 0.2384 (0.0358) |
| 8× | U-Net (E1/E2) | 30.61 (1.55) | 32.91 (1.02) | 0.7266 (0.0295) | 0.6736 (0.0352) | 0.2138 (0.0290) | 0.3359 (0.0410) |
| | U-Net (E1 + E2) | 30.78 (1.24) | 32.51 (1.00) | 0.7219 (0.0300) | 0.6835 (0.0352) | 0.2091 (0.0214) | 0.3511 (0.0350) |
| | U-Net (E1⊕E2) | 30.79 (1.23) | 32.74 (1.03) | 0.7212 (0.0293) | 0.6787 (0.0386) | 0.2088 (0.0217) | 0.3423 (0.0397) |
| | Unrolled (E1/E2) | 33.83 (1.07) | 33.73 (1.06) | 0.7927 (0.0274) | 0.7267 (0.0334) | 0.1471 (0.0157) | 0.3062 (0.0406) |
| | Unrolled (E1 + E2) | 33.82 (1.07) | 33.62 (1.07) | 0.7969 (0.0268) | 0.7064 (0.0346) | 0.1473 (0.0158) | 0.3102 (0.0416) |
| | Unrolled (E1⊕E2) | 33.90 (1.08) | 33.88 (1.07) | 0.7965 (0.0270) | 0.7262 (0.0327) | 0.1460 (0.0152) | 0.3010 (0.0405) |
| | ML Fra. 200 (E1/E2) | 35.28 (1.12) | 35.27 (1.12) | 0.8907 (0.0153) | 0.8315 (0.0301) | 0.1251 (0.0195) | 0.2567 (0.0358) |
| | ML Fra. 200 (E1 + E2) | 35.22 (1.11) | 35.29 (1.12) | 0.8896 (0.0151) | 0.8319 (0.0301) | 0.1260 (0.0188) | 0.2562 (0.0357) |
| | ML Fra. 200 (E1⊕E2) | 35.27 (1.17) | 35.37 (1.15) | 0.8901 (0.0156) | 0.8344 (0.0306) | 0.1254 (0.0200) | 0.2539 (0.0366) |

To show the generalization of the proposed method, ML framework 200 was trained and evaluated on the SKM-TEA dataset and compared with baselines of the raw data benchmark reconstruction track, including U-Net and unrolled networks. All comparison models were trained to reconstruct 2D under-sampled and complex-valued axial slices at acceleration factors of 6× and 8×. Models were trained with three configurations to reconstruct E1 and E2 echoes for 3D images: (1) separate models for each echo (E1/E2), (2) a single model for both echoes, with each echo as a unique training example (E1+E2), and (3) a single model for both echoes, with echoes as multiple channels of a single example (E1⊕E2). The image reconstruction qualities of both qDESS echoes are evaluated separately using the standard image quality analyzers of PSNR and SSIM metrics like other datasets.

Table 3 shows quantitative evaluation results of the SKM-TEA reconstruction with respect to absolute $T_2$ error (in milliseconds) for articular cartilage and the meniscus localized with ground truth segmentations, with mean values shown outside parentheses and standard deviations shown inside parentheses. Typical cartilage $T_2$ values are 30-40 ms, while meniscus $T_2$ values are 10-15 ms). It can be observed that the proposed method outperforms the benchmark reconstruction models by large margins in both PSNR and SSIM at both accelerations and across both echoes, regardless of how multi-echo images were fed into the models.

superiority of the proposed method in MRI reconstruction. Images reconstructed using ML framework 200 are sharper than the ground-truth references. This is because the raw k-space data were acquired with 2×1 parallel imaging and were reconstructed using SENSE. However, ML framework 200 jointly optimizes multiple priors along with coil sensitivity estimation in a unified end-to-end framework, which can produce a closer solution than SENSE reconstructions (ground-truth references).

Figure 11A:
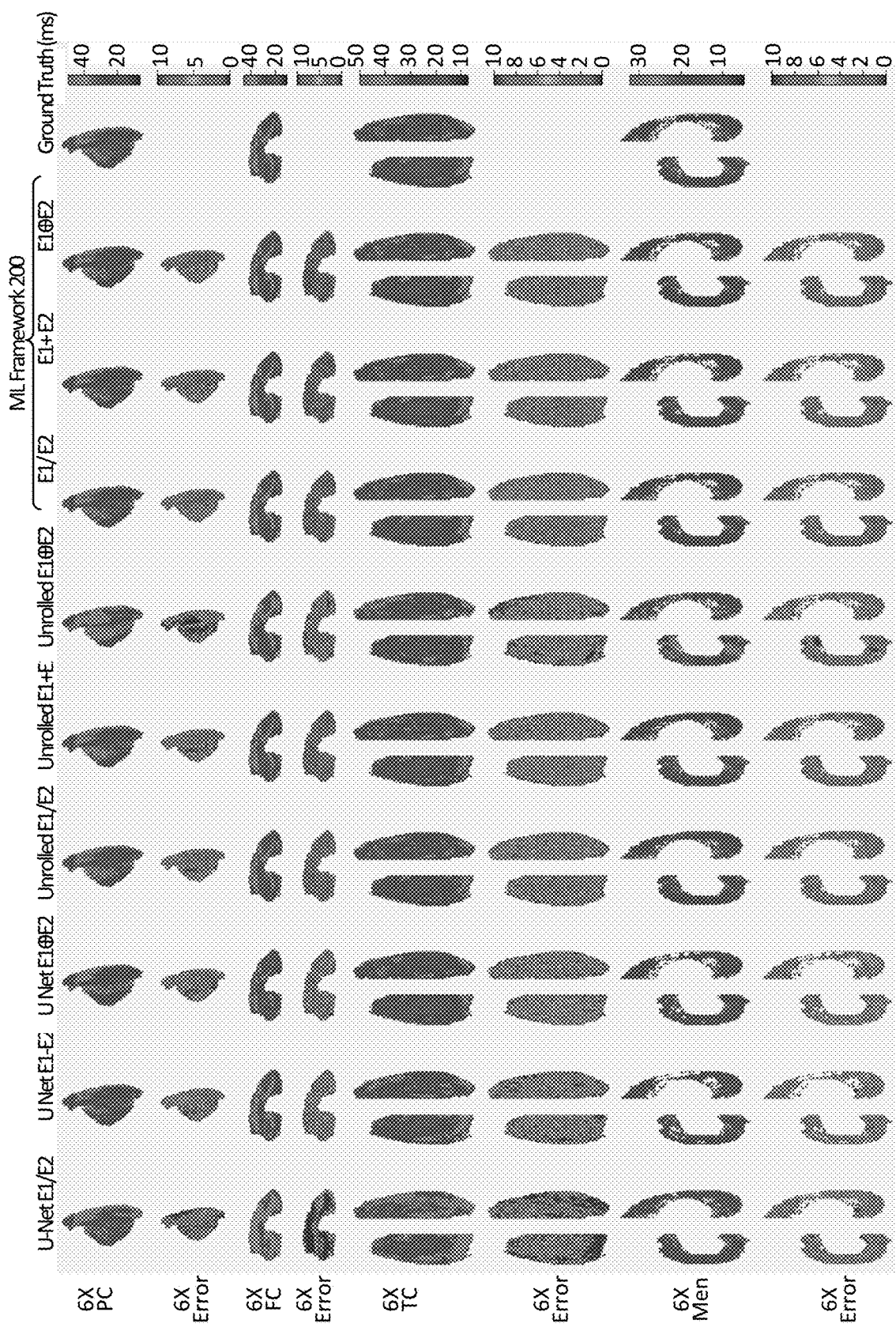
FIGS. 11A and 11B shows examples of T2 maps estimation of articular cartilage and meniscus for the SKM-TEA dataset at acceleration factors of 6× and 8×.
Figure 11B:
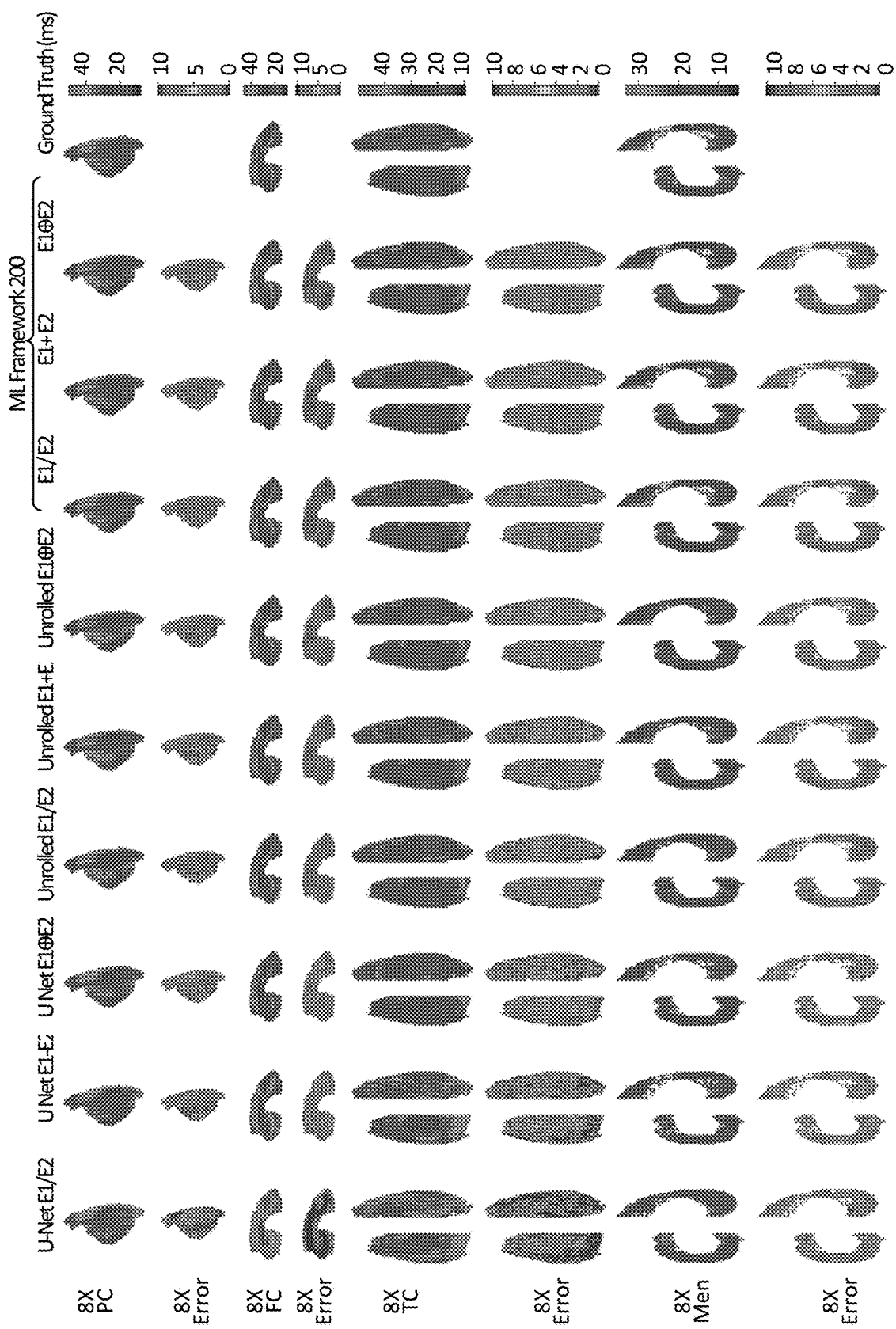

FIGS. 11A and 11B shows examples of $T_2$ maps estimation of articular cartilage and the meniscus for the SKM-TEA dataset at acceleration factors of 6× and 8×. Tissue regions are localized with ground truth segmentations. Reconstructed qDESS echo images and ground-truth tissue segmentation were utilized to estimate tissue-wise T2 maps, including patellar cartilage (PC), femoral cartilage (FC), tibial cartilage (TC), and meniscus (Men). It can be observed that ML framework 200 can achieve more consistent performances than the benchmarks in image reconstruction and $T_2$ estimation. These results demonstrate that the ML framework 200 can generate high-quality reconstruction images, especially the details, and can benefit qMRI parameter estimation.

Figure 12:
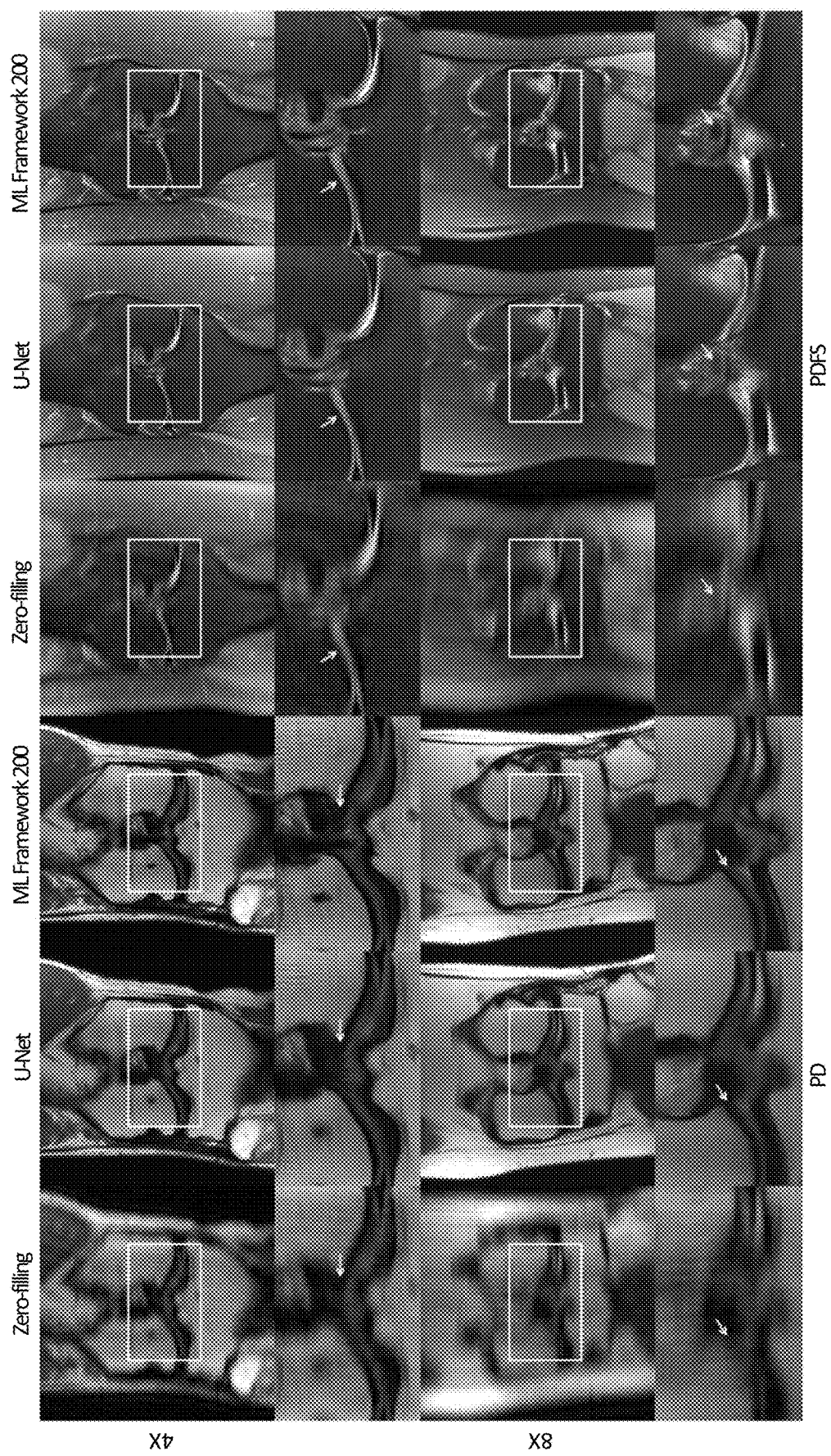
FIG. 12 shows reconstruction examples of both PD and PDFS images from unseen test data from the fastMRI knee dataset, at both acceleration factors of 4× and 8×.

FIG. 12 shows reconstruction examples of both PD and PDFS images from unseen test data from the fastMRI knee dataset, at both acceleration factors of 4× and 8×. It can be observed that machine learning framework 200 provided

TABLE 3

|  | 6× | | | | 8× | | | |
| --- | --- | --- | --- | --- | --- | --- | --- | --- |
|  | PC | FC | TC | Men | PC | FC | TC | Men |
| U-Net (E1/E2) | 2.189 (1.677) | 1.077 (0.939) | 1.615 (0.948) | 2.698 (1.350) | 3.481 (1.741) | 2.711 (1.375) | 3.207 (1.242) | 3.763 (1.101) |
| U-Net (E1 + E2) | 2.831 (1.949) | 2.460 (1.877) | 1.462 (0.917) | 2.009 (1.418) | 2.659 (2.061) | 3.037 (2.027) | 1.486 (1.157) | 2.387 (1.308) |
| U-Net (E1⊕E2) | 1.769 (1.503) | 1.115 (0.782) | 1.538 (1.029) | 1.814 (0.966) | 1.291 (1.088) | 1.262 (0.913) | 2.085 (1.131) | 2.494 (1.800) |
| Unrolled (E1/E2) | 0.563 (0.233) | 0.765 (0.283) | 1.030 (0.419) | 2.479 (0.786) | 0.721 (0.297) | 0.899 (0.336) | 1.259 (0.486) | 2.779 (0.868) |
| Unrolled (E1 + E2) | 0.570 (0.233) | 0.836 (0.319) | 1.124 (0.421) | 2.519 (0.780) | 0.971 (0.419) | 0.988 (0.394) | 1.295 (0.494) | 2.862 (0.882) |
| Unrolled (E1⊕E2) | 1.685 (1.362) | 2.013 (0.917) | 1.341 (0.555) | 1.310 (0.819) | 0.588 (0.292) | 0.992 (0.432) | 1.332 (0.626) | 2.729 (0.891) |
| ML Fra. 200 (E1/E2) | 0.434 (0.377) | 0.445 (0.483) | 0.481 (0.472) | 0.486 (0.394) | 0.420 (0.411) | 0.480 (0.557) | 0.551 (0.645) | 0.736 (0.658) |
| ML Fra. 200 (E1 + E2) | 0.259 (0.266) | 0.361 (0.455) | 0.432 (0.463) | 0.536 (0.299) | 0.290 (0.321) | 0.423 (0.459) | 0.488 (0.480) | 0.759 (0.463) |
| ML Fra. 200 (E1⊕E2) | 0.311 (0.349) | 0.474 (0.584) | 0.449 (0.532) | 0.470 (0.374) | 0.363 (0.369) | 0.566 (0.724) | 0.517 (0.655) | 0.568 (0.404) |

Figure 10A:
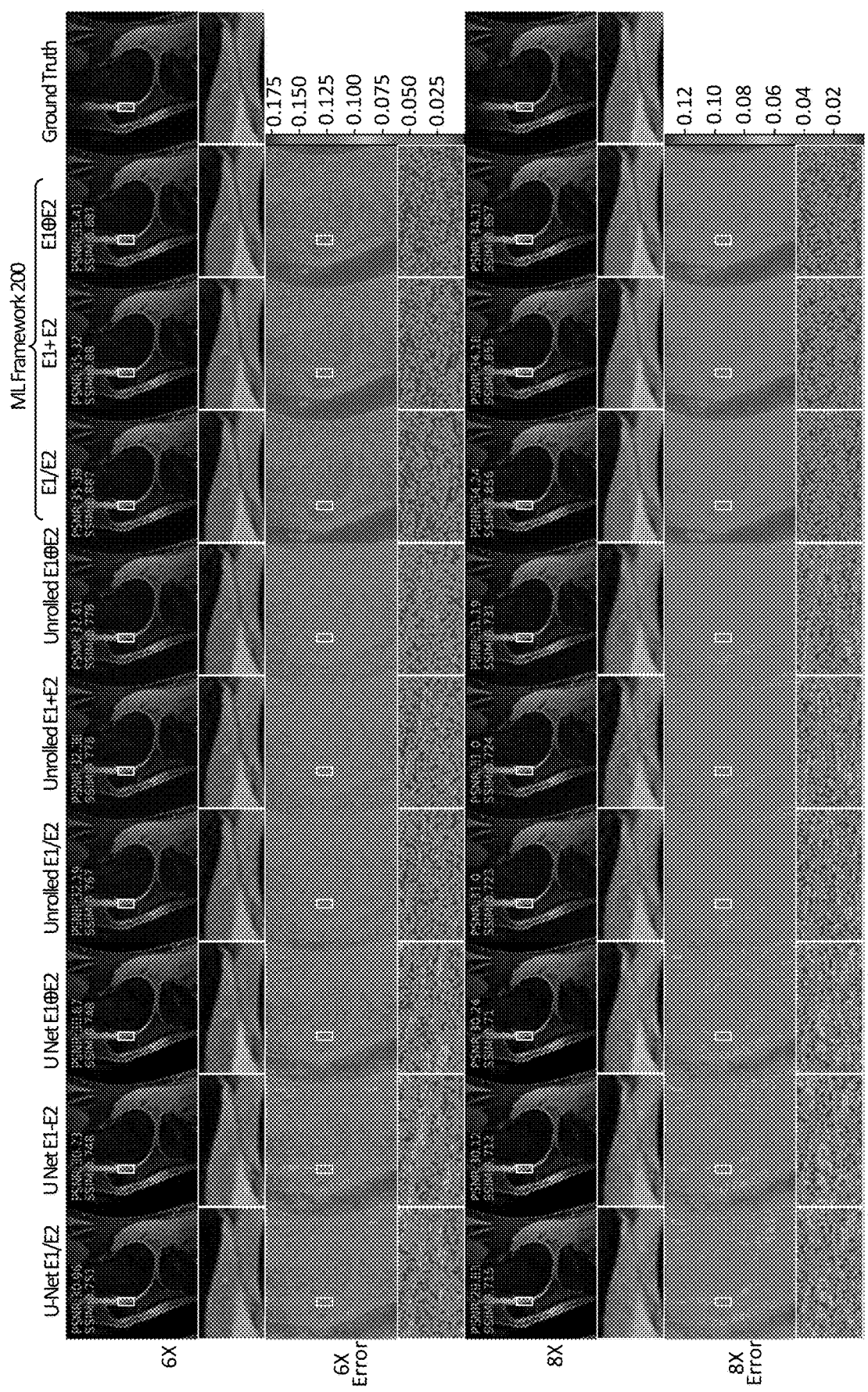
FIGS. 10A and 10B shows reconstruction images and error maps for both qDESS echoes at both accelerations 6× and 8×.
Figure 10B:
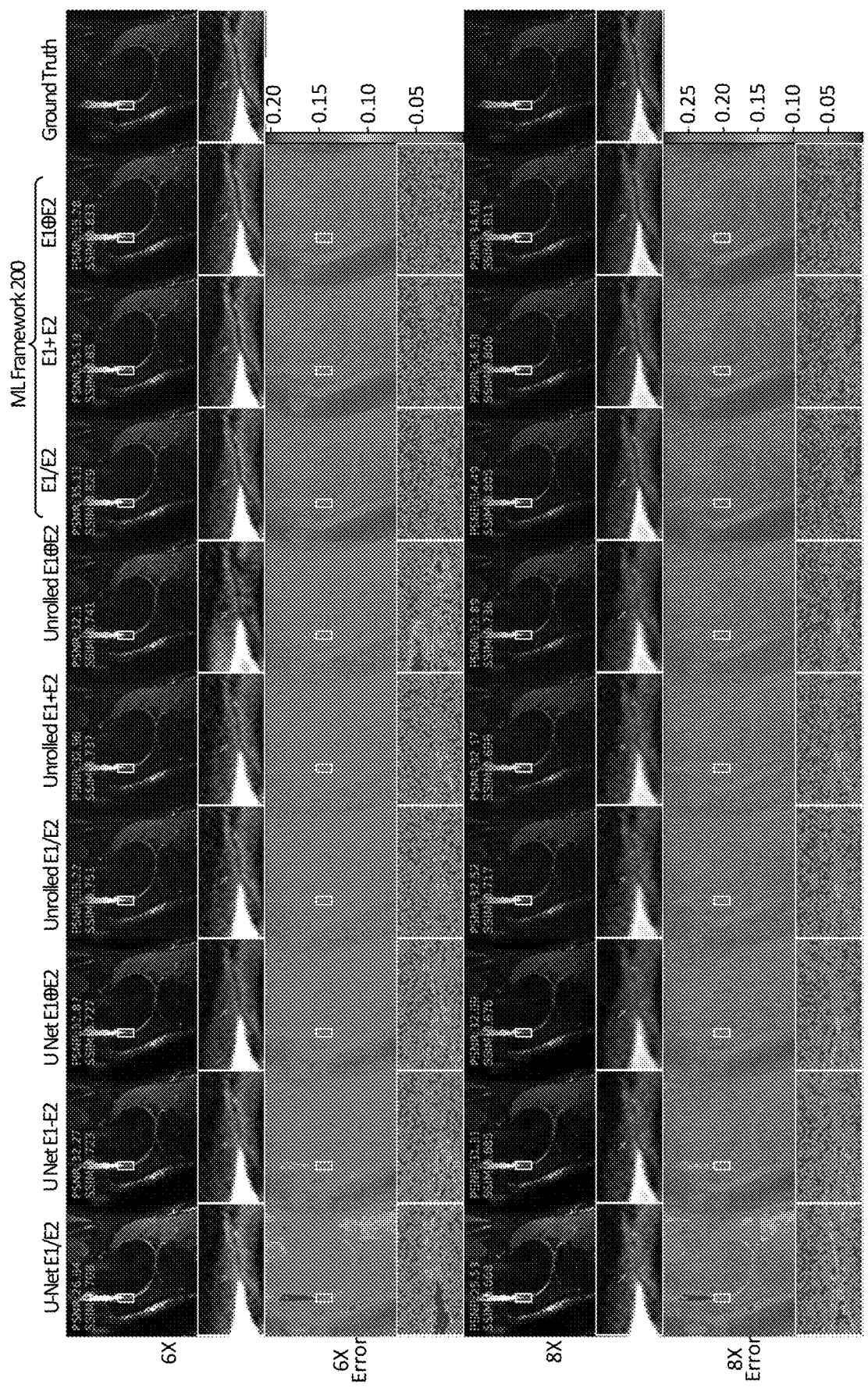

FIGS. 10A and 10B shows reconstruction images and error maps for both qDESS echoes at both accelerations 6× and 8× (E1 in FIG. 10A and E2 in FIG. 10B). Each image includes a zoomed-in view, providing visualization of the subtle features of the patellar cartilage, femoral cartilage, and their joint space. It can be observed that the benchmarks perform poorly in reconstructing tissue details. In contrast, ML framework 200 can recover subtle textures for both echoes across different data configurations, even at high accelerations, which indicates more high-frequency information is learned from the multi-prior collaborative learning framework. Small values in the error map also indicate the reconstructed images with better visualization of fine structures compared to the other methods. The boundaries of the articular cartilage and cruciate ligament (indicated by arrows) were better depicted with machine learning framework 200 reconstruction at both acceleration factors of 4× and 8×, for both PD and PDFS acquisitions. These results demonstrated the potential of generalizability of machine learning framework 200 in capturing and preserving intricate features.

Table 4 shows Public Leaderboard Results for acceleration factors of 4× and 8× on the fastMRI Multi-Coil Knee dataset.

TABLE 4

| Acc. | Model | SSIM ↑ | | | PSNR ↑ | | |
|---|---|---|---|---|---|---|---|
| | | ALL | PD | PDFS | ALL | PD | PDFS |
| 6× | ML Fra. 200 | 0.9320 | 0.9642 | 0.8974 | 40.3 | 42.1 | 38.3 |
| | HUMUS-Net | 0.9238 | 0.9556 | 0.8898 | 38.2 | 40.0 | 36.3 |
| | E2EVarNet | 0.9302 | 0.9619 | 0.8962 | 39.9 | 41.6 | 38.1 |
| | i-RIM | 0.9278 | 0.9592 | 0.8942 | 39.6 | 41.2 | 38.0 |
| | Σ-Net | 0.9282 | 0.9611 | 0.8929 | 39.8 | 41.6 | 38.0 |
| | XPDNet | 0.9287 | 0.9623 | 0.8926 | 40.2 | 42.0 | 38.2 |
| | U-Net | 0.9103 | 0.9377 | 0.8808 | 37.6 | 38.2 | 37.0 |
| 8× | ML Fra. 200 | 0.8949 | 0.9430 | 0.8499 | 37.4 | 39.2 | 35.8 |
| | HUMUS-Net | 0.8945 | 0.9419 | 0.8501 | 37.3 | 39.0 | 35.7 |
| | E2EVarNet | 0.8920 | 0.9393 | 0.8477 | 37.1 | 38.6 | 35.6 |
| | i-RIM | 0.8875 | 0.9338 | 0.8442 | 36.7 | 38.0 | 35.4 |
| | Σ-Net | 0.8877 | 0.9354 | 0.8431 | 36.7 | 38.2 | 35.4 |
| | XPDNet | 0.8893 | 0.9383 | 0.8435 | 37.2 | 38.8 | 35.7 |
| | U-Net | 0.8640 | 0.9054 | 0.8253 | 34.7 | 35.3 | 34.2 |

Figure 13:
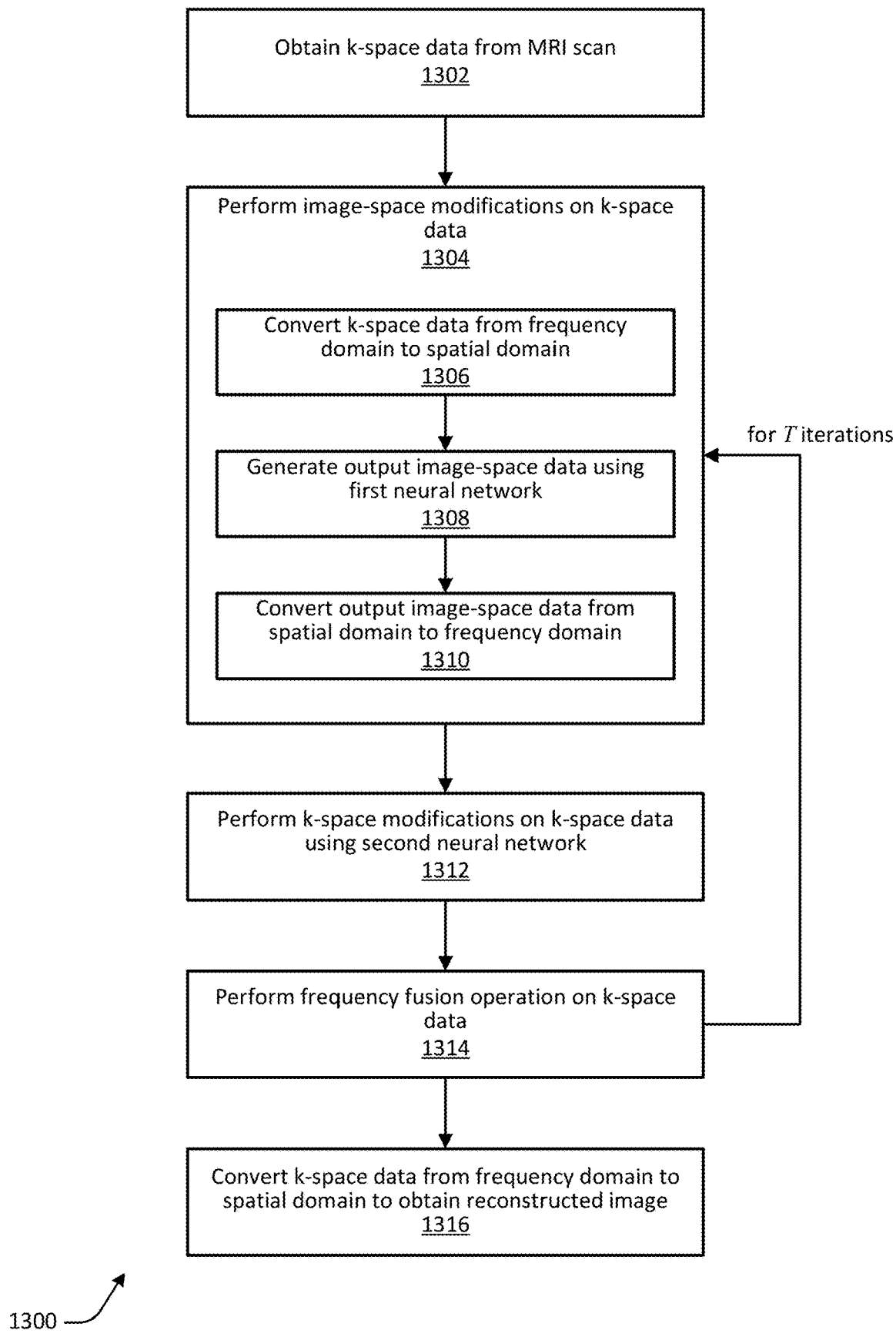
FIG. 13 shows a method of performing MRI image reconstruction.

FIG. 13 illustrates a method 1300 of performing MRI image reconstruction, in accordance with some embodiments of the present disclosure. Steps of method 1300 may be performed in any order and/or in parallel, and one or more steps of method 1300 may be optionally performed. One or more steps of method 1300 may be performed by one or more processors, such as those included in a neural network processor or those included in a system implementing an ML framework (e.g., ML framework 200). Method 1300 may be implemented as a computer-readable medium or computer program product comprising instructions which, when the program is executed by one or more processors, cause the one or more processors to carry out the steps of method 1300.

At step 1302, k-space data (e.g., k-space data 202) is obtained from an MRI scan. The k-space data may be a frequency domain representation of an MRI image or signal. The k-space data may be under-sampled in the frequency domain. The k-space data may be zero-filled by adding zeroes to the k-space data matrix, either by expanding the matrix dimensions or filling in empty k-space lines with zeroes.

At step 1304, image-space modifications are performed on the k-space data using a first neural network (e.g., CNN 222) trained to operate on data in image space. Step 1304 may include performing steps 1306 to 1310. In some examples, step 1304 (and consequently steps 1306 to 1310) may be performed by an image enhancement module (e.g., image enhancement module 206) of the ML framework.

At step 1306, the k-space data is converted from the frequency domain to a spatial domain to produce input image-space data (e.g., input image-space data 252). The k-space data may be converted from the frequency domain to the spatial domain using the inverse Fourier Transform or inverse Fast Fourier Transform algorithm. In some examples, the k-space data may be converted from the frequency domain to the spatial domain further using a set of coil sensitivity maps (e.g., coil sensitivity maps 216), which may be estimated based on the k-space data.

At step 1308, output image-space data (e.g., output image-space data 254) is generated by inputting the input image-space data into the first neural network. In response to receiving the input image-space data as input, the first neural network may generate the output image-space data by passing the input image-space data through a set of layers having weights. The set of layers may include convolutional layers, activation layers, pooling layers, fully-connected layers etc.

At step 1310, the output image-space data is converted from the spatial domain to the frequency domain to obtain the k-space data incorporating the image-space modifications. The output image-space data may be converted from the spatial domain to the frequency domain using the Fourier Transform or Fast Fourier Transform algorithm. In some examples, the output image-space data may be converted from the spatial domain to the frequency domain further using the set of coil sensitivity maps.

At step 1312, k-space modifications are performed on the k-space data using a second neural network (e.g., CNN 224) trained to operate on data in k-space by inputting the k-space data into the second neural network to obtain the k-space data incorporating the k-space modifications. In response to receiving the k-space data (incorporating the image-space modifications due to step 1304) as input, the second neural network may generate the k-space data incorporating the k-space modifications (in addition to the image-space modifications) by passing the input image-space data through a set of layers having weights. The set of layers may include convolutional layers, activation layers, pooling layers, fully-connected layers etc. In some examples, step 1312 may be performed by a k-space restoration module (e.g., k-space restoration module 208) of the ML framework.

At step 1314, optionally, a frequency fusion operation is performed on the k-space data by summing the k-space data incorporating the image-space modifications (outputted by step 1310) and the k-space data incorporating the k-space modifications (outputted by step 1312). In some examples, step 1314 may be performed by a frequency fusion module (e.g., frequency fusion module 212) of the ML framework. After performing step 1314, method 1300 may return to step 1304 to perform steps 1304 to 1314 during additional iterations, up to T iterations. For example, the k-space data incorporating the image-space modifications and the k-space modifications outputted by steps 1314 (or step 1312) for the (t)-th iteration may be fed back to the image enhancement module as input for the (t+1)-th iteration.

At step 1316, the k-space data is converted from the frequency domain to the spatial domain to obtain a reconstructed image (e.g., reconstructed image 204). In some examples, the reconstructed image is obtained further using the set of coil sensitivity maps.

In some examples, method 1300 may further include steps for training the first neural network and/or the second neural network. Such training may include a supervised learning process that involves iteratively adjusting the weights to minimize the difference between the reconstructed image and a reference image (e.g., reference image 234). In some examples, the weights and biases of the layers of the first neural network and the second neural network are randomly initialized using a specific initialization technique, such as Gaussian or Xavier initialization.

Next, training k-space data is obtained and passed through the ML framework (using both neural networks) to iteratively perform steps 1304 to 1314 and thereafter step 1316 to obtain a training reconstructed image. The difference between the training reconstructed image and the reference image is quantified using a loss function implemented at a loss block (e.g., loss block 242), which computes a reconstruction loss (e.g., reconstruction loss 244). The weights of the first neural network and the second neural network may then be updated using the reconstruction loss. These training steps may be completed for multiple epochs (complete passes through the training dataset) or until a stopping criterion is met, such as reaching a maximum number of epochs, achieving a certain level of performance, or when the validation performance no longer improves.

Figure 14:
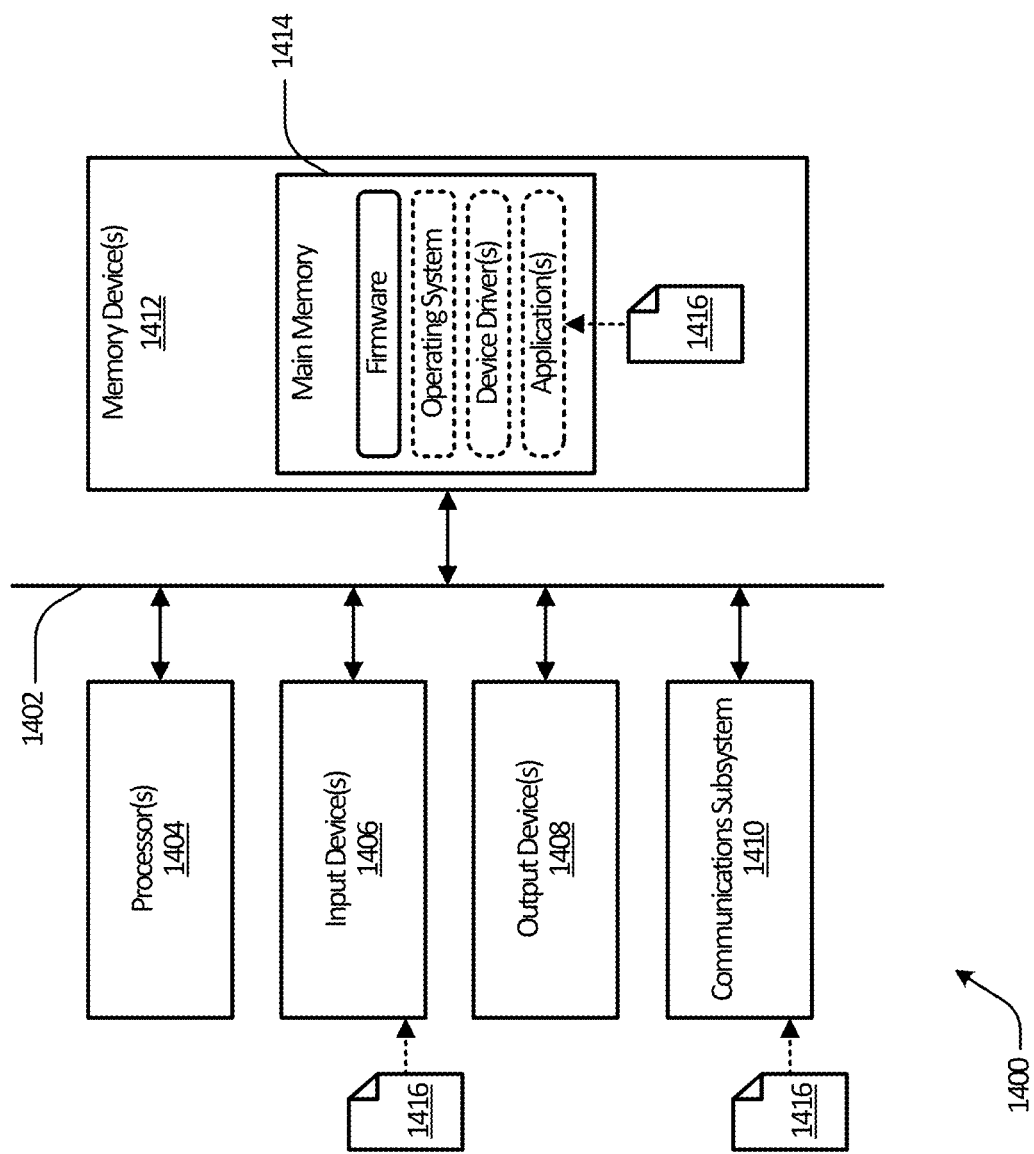
FIG. 14 shows an example computer system comprising various hardware elements.

FIG. 14 illustrates an example computer system 1400 comprising various hardware elements, in accordance with some embodiments of the present disclosure. Computer system 1400 may be incorporated into or integrated with devices described herein and/or may be configured to perform some or all of the steps of the methods provided by various embodiments. For example, in various embodiments, computer system 1400 may be configured to perform method 1000. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

In the illustrated example, computer system 1400 includes a communication medium 1402, one or more processor(s) 1404, one or more input device(s) 1406, one or more output device(s) 1408, a communications subsystem 1410, and one or more memory device(s) 1412. Computer system 1400 may be implemented using various hardware implementations and embedded system technologies. For example, one or more elements of computer system 1400 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 1400 may be communicatively coupled via communication medium 1402. While communication medium 1402 is illustrated as a single connection for purposes of clarity, it should be understood that communication medium 1402 may include various numbers and types of communication media for transferring data between hardware elements. For example, communication medium 1402 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1402 may include one or more buses that connect the pins of the hardware elements of computer system 1400. For example, communication medium 1402 may include a bus that connects processor(s) 1404 with main memory 1414, referred to as a system bus, and a bus that connects main memory 1414 with input device(s) 1406 or output device(s) 1408, referred to as an expansion bus. The system bus may itself consist of several buses, including an address bus, a data bus, and a control bus. The address bus may carry a memory address from processor(s) 1404 to the address bus circuitry associated with main memory 1414 in order for the data bus to access and carry the data contained at the memory address back to processor(s) 1404. The control bus may carry commands from processor(s) 1404 and return status signals from main memory 1414. Each bus may include multiple wires for carrying multiple bits of information and each bus may support serial or parallel transmission of data.

Processor(s) 1404 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1404 may include one or more multi-core processors, in which each core may read and execute program instructions concurrently with the other cores, increasing speed for programs that support multithreading.

Input device(s) 1406 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 1406 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1408 may include one or more of various devices that convert information into human-readable form, such as without limitation a display device, a speaker, a printer, a haptic or tactile device, and/or the like. Output device(s) 1408 may also include devices for writing to removable storage devices or other removable media, such as those described in reference to input device(s) 1406. Output device(s) 1408 may also include various actuators for causing physical movement of one or more components. Such actuators may be hydraulic, pneumatic, electric, and may be controlled using control signals generated by computer system 1400.

Communications subsystem 1410 may include hardware components for connecting computer system 1400 to systems or devices that are located external to computer system 1400, such as over a computer network. In various embodiments, communications subsystem 1410 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1412 may include the various data storage devices of computer system 1400. For example, memory device(s) 1412 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1404 and memory device(s) 1412 are illustrated as being separate elements, it should be understood that processor(s) 1404 may include varying levels of on-processor memory, such as processor registers and caches that may be utilized by a single processor or shared between multiple processors.

Memory device(s) 1412 may include main memory 1414, which may be directly accessible by processor(s) 1404 via the address and data buses of communication medium 1402. For example, processor(s) 1404 may continuously read and execute instructions stored in main memory 1414. As such, various software elements may be loaded into main memory 1414 to be read and executed by processor(s) 1404 as illustrated in FIG. 14. Typically, main memory 1414 is volatile memory, which loses all data when power is turned off and accordingly needs power to preserve stored data. Main memory 1414 may further include a small portion of non-volatile memory containing software (e.g., firmware, such as BIOS) that is used for reading other software stored in memory device(s) 1412 into main memory 1414. In some embodiments, the volatile memory of main memory 1414 is implemented as RAM, such as dynamic random-access memory (DRAM), and the non-volatile memory of main memory 1414 is implemented as read-only memory (ROM), such as flash memory, erasable programmable read-only memory (EPROM), or electrically erasable programmable read-only memory (EEPROM).

Computer system 1400 may include software elements, shown as being currently located within main memory 1414, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1416, which are executable by computer system 1400. In one example, such instructions 1416 may be received by computer system 1400 using communications subsystem 1410 (e.g., via a wireless or wired signal that carries instructions 1416), carried by communication medium 1402 to memory device(s) 1412, stored within memory device(s) 1412, read into main memory 1414, and executed by processor(s) 1404 to perform one or more steps of the described methods. In another example, instructions 1416 may be received by computer system 1400 using input device(s) 1406 (e.g., via a reader for removable media), carried by communication medium 1402 to memory device(s) 1412, stored within memory device(s) 1412, read into main memory 1414, and executed by processor(s) 1404 to perform one or more steps of the described methods.

In some embodiments of the present disclosure, instructions 1416 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1400. For example, the non-transitory computer-readable medium may be one of memory device(s) 1412 (as shown in FIG. 14). In some cases, the non-transitory computer-readable medium may be separate from computer system 1400. In one example, the non-transitory computer-readable medium may be a removable medium provided to input device(s) 1406 (as shown in FIG. 14), such as those described in reference to input device(s) 1406, with instructions 1416 being read into computer system 1400 by input device(s) 1406. In another example, the non-transitory computer-readable medium may be a component of a remote electronic device, such as a mobile phone, that may wirelessly transmit a data signal that carries instructions 1416 to computer system 1400 and that is received by communications subsystem 1410 (as shown in FIG. 14).

Instructions 1416 may take any suitable form to be read and/or executed by computer system 1400. For example, instructions 1416 may be source code (written in a human-readable programming language such as Java, C, C++, C#, Python), object code, assembly language, machine code, microcode, executable code, and/or the like. In one example, instructions 1416 are provided to computer system 1400 in the form of source code, and a compiler is used to translate instructions 1416 from source code to machine code, which may then be read into main memory 1414 for execution by processor(s) 1404. As another example, instructions 1416 are provided to computer system 1400 in the form of an executable file with machine code that may immediately be read into main memory 1414 for execution by processor(s) 1404. In various examples, instructions 1416 may be provided to computer system 1400 in encrypted or unencrypted form, compressed or uncompressed form, as an installation package or an initialization for a broader software deployment, among other possibilities.

In one aspect of the present disclosure, a system (e.g., computer system 1400) is provided to perform methods in accordance with various embodiments of the present disclosure. For example, some embodiments may include a system comprising one or more processors (e.g., processor(s) 1404) that are communicatively coupled to a non-transitory computer-readable medium (e.g., memory device(s) 1412 or main memory 1414). The non-transitory computer-readable medium may have instructions (e.g., instructions 1416) stored therein that, when executed by the one or more processors, cause the one or more processors to perform the methods described in the various embodiments.

In another aspect of the present disclosure, a computer-program product that includes instructions (e.g., instructions 1416) is provided to perform methods in accordance with various embodiments of the present disclosure. The computer-program product may be tangibly embodied in a non-transitory computer-readable medium (e.g., memory device(s) 1412 or main memory 1414). The instructions may be configured to cause one or more processors (e.g., processor(s) 1404) to perform the methods described in the various embodiments.

In another aspect of the present disclosure, a non-transitory computer-readable medium (e.g., memory device(s) 1412 or main memory 1414) is provided. The non-transitory computer-readable medium may have instructions (e.g., instructions 1416) stored therein that, when executed by one or more processors (e.g., processor(s) 1404), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered.

Accordingly, the above description does not bind the scope of the claims. As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of performing magnetic resonance imaging (MRI) image reconstruction, the computer-implemented method comprising:
    obtaining k-space data from an MRI scan, wherein the k-space data is under-sampled in a frequency domain;
    for each of a set of iterations:
        performing image-space modifications on the k-space data using a first neural network trained to operate on data in image space by:
            converting the k-space data from the frequency domain to a spatial domain to produce input image-space data;
            generating, using the first neural network, output image-space data by inputting the input image-space data into the first neural network; and
            converting the output image-space data from the spatial domain to the frequency domain to obtain the k-space data incorporating the image-space modifications; and
        performing k-space modifications on the k-space data using a second neural network trained to operate on data in k-space by inputting the k-space data into the second neural network to obtain the k-space data incorporating the k-space modifications; and
    converting the k-space data from the frequency domain to the spatial domain to obtain a reconstructed image.

2. The computer-implemented method of claim 1, further comprising:
    zero-filling the k-space data.

3. The computer-implemented method of claim 1, further comprising:
    estimating a set of coil sensitivity maps based on the k-space data, wherein the image-space modifications are performed on the k-space data further using the set of coil sensitivity maps.

4. The computer-implemented method of claim 3, wherein the reconstructed image is obtained by using the set of coil sensitivity maps to compensate for an uneven signal reception strength for individual receiver coils used in a multi-coil setup.

5. The computer-implemented method of claim 1, further comprising:
    for each of the set of iterations:
        performing a frequency fusion operation on the k-space data by summing the k-space data incorporating the image-space modifications and the k-space data incorporating the k-space modifications.

6. The computer-implemented method of claim 5, wherein performing the frequency fusion operation includes using an under-sampling pattern to sum the k-space data incorporating the image-space modifications and the k-space data incorporating the k-space modifications.

7. The computer-implemented method of claim 1, wherein one or both of the first neural network and the second neural network were previously trained by:
    obtaining training k-space data;
    performing the image-space modifications and the k-space modifications on the training k-space data and thereafter converting the training k-space data from the frequency domain to the spatial domain to obtain a training reconstructed image;
    comparing the training reconstructed image to a reference image to compute a reconstruction loss; and
    modifying weights associated with one or both of the first neural network and the second neural network based on the reconstruction loss.

8. The computer-implemented method of claim 1, wherein the k-space data incorporating the k-space modifications is obtained further using a surface data fidelity layer configured to reduce effects of data imperfections due to padding in the k-space domain.

9. The computer-implemented method of claim 1, wherein the k-space data incorporating the k-space modifications is obtained further using a calibration consistency module configured to encode calibration features from auto-calibration signals (ACS) and to guide the second neural network in learning consistency-aware k-space correlations, the calibration consistency module comprising a third neural network.

10. A non-transitory computer-readable medium comprising instructions that, when executed by one or more processors, cause the one or more processors to perform operations comprising:
    obtaining k-space data from a magnetic resonance imaging (MRI) scan, wherein the k-space data is under-sampled in a frequency domain;
    for each of a set of iterations:
        performing image-space modifications on the k-space data using a first neural network trained to operate on data in image space by:
            converting the k-space data from the frequency domain to a spatial domain to produce input image-space data;
            generating, using the first neural network, output image-space data by inputting the input image-space data into the first neural network; and converting the output image-space data from the spatial domain to the frequency domain to obtain the k-space data incorporating the image-space modifications; and performing k-space modifications on the k-space data using a second neural network trained to operate on data in k-space by inputting the k-space data into the second neural network to obtain the k-space data incorporating the k-space modifications; and converting the k-space data from the frequency domain to the spatial domain to obtain a reconstructed image.

11. The non-transitory computer-readable medium of claim 10, wherein the operations further comprise:
zero-filling the k-space data.

12. The non-transitory computer-readable medium of claim 10, wherein the operations further comprise:
estimating a set of coil sensitivity maps based on the k-space data, wherein the image-space modifications are performed on the k-space data further using the set of coil sensitivity maps.

13. The non-transitory computer-readable medium of claim 12, wherein the reconstructed image is obtained by using the set of coil sensitivity maps to compensate for an uneven signal reception strength for individual receiver coils used in a multi-coil setup.

14. The non-transitory computer-readable medium of claim 10, wherein the operations further comprise:
for each of the set of iterations:
performing a frequency fusion operation on the k-space data by summing the k-space data incorporating the image-space modifications and the k-space data incorporating the k-space modifications.

15. The non-transitory computer-readable medium of claim 10, wherein the k-space data incorporating the k-space modifications is obtained further using a calibration consistency module configured to encode calibration features from auto-calibration signals (ACS) and to guide the second neural network in learning consistency-aware k-space correlations, the calibration consistency module comprising a third neural network.

16. The non-transitory computer-readable medium of claim 10, wherein the operations further comprise:
training one or both of the first neural network and the second neural network by:
obtaining training k-space data;
performing the image-space modifications and the k-space modifications on the training k-space data and thereafter converting the training k-space data from the frequency domain to the spatial domain to obtain a training reconstructed image;
comparing the training reconstructed image to a reference image to compute a reconstruction loss; and
modifying weights associated with one or both of the first neural network and the second neural network based on the reconstruction loss.

17. A system comprising:
one or more processors; and
a computer-readable medium comprising instructions that, when executed by the one or more processors, cause the one or more processors to perform operations comprising:
obtaining k-space data from a magnetic resonance imaging (MRI) scan, wherein the k-space data is under-sampled in a frequency domain;
for each of a set of iterations:
performing image-space modifications on the k-space data using a first neural network trained to operate on data in image space by:
converting the k-space data from the frequency domain to a spatial domain to produce input image-space data;
generating, using the first neural network, output image-space data by inputting the input image-space data into the first neural network; and
converting the output image-space data from the spatial domain to the frequency domain to obtain the k-space data incorporating the image-space modifications; and
performing k-space modifications on the k-space data using a second neural network trained to operate on data in k-space by inputting the k-space data into the second neural network to obtain the k-space data incorporating the k-space modifications; and
converting the k-space data from the frequency domain to the spatial domain to obtain a reconstructed image.

18. The system of claim 17, wherein the operations further comprise:
zero-filling the k-space data.

19. The system of claim 17, wherein the operations further comprise:
estimating a set of coil sensitivity maps based on the k-space data, wherein the image-space modifications are performed on the k-space data further using the set of coil sensitivity maps.

20. The system of claim 17, wherein the k-space data incorporating the k-space modifications is obtained further using a calibration consistency module configured to encode calibration features from auto-calibration signals (ACS) and to guide the second neural network in learning consistency-aware k-space correlations, the calibration consistency module comprising a third neural network.

* * * * *